(12) United States Patent
Suzuki et al.

(10) Patent No.: US 8,412,875 B2
(45) Date of Patent: *Apr. 2, 2013

(54) SWITCH AND NETWORK BRIDGE APPARATUS

(75) Inventors: Jun Suzuki, Tokyo (JP); Youichi Hidaka, Tokyo (JP); Junichi Higuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/037,999

(22) Filed: Mar. 1, 2011

(65) Prior Publication Data

US 2011/0153906 A1 Jun. 23, 2011

Related U.S. Application Data

(62) Division of application No. 11/707,084, filed on Feb. 16, 2007, now Pat. No. 7,917,681.

(30) Foreign Application Priority Data

Feb. 17, 2006 (JP) ................................. 2006-040228

(51) Int. Cl.
*G06F 13/36* (2006.01)
(52) U.S. Cl. ........ 710/312; 370/386; 710/306; 710/311; 710/313; 710/314; 710/315
(58) Field of Classification Search .......... 710/306–316; 370/385, 386, 389, 392
See application file for complete search history.

(56) References Cited

U.S. PATENT DOCUMENTS

| | | | |
|---|---|---|---|
| 6,772,267 B2 * | 8/2004 | Thaler et al. ................... | 710/306 |
| 6,944,692 B2 * | 9/2005 | Smith et al. ................... | 710/106 |
| 7,058,738 B2 * | 6/2006 | Stufflebeam, Jr. ............ | 710/104 |
| 7,096,310 B2 * | 8/2006 | Norden ......................... | 710/317 |

(Continued)

FOREIGN PATENT DOCUMENTS

| | | |
|---|---|---|
| JP | 2002-149592 | 5/2002 |
| JP | 2004-531175 | 10/2004 |

(Continued)

OTHER PUBLICATIONS

Bhatt, Ajay. Creating a PCI Express Interconnect. White Paper. 2002.*

(Continued)

*Primary Examiner* — Matthew D Spittle
(74) *Attorney, Agent, or Firm* — Young & Thompson

(57) ABSTRACT

A network system that is part of a main system includes: a first PCI express-network bridge with a first control unit and a first PCI express adapter terminating a first PCI express bus; and a second PCI express-network bridge connected to the first PCI express-network bridge through a network. The second PCI express-network bridge includes a second control unit and a second PCI express adapter terminating a second PCI express bus, wherein the first control unit detects a destination of a packet sent from the first PCI express adapter, searches a physical address of the destination from a packet encapsulating table, and encapsulates the packet in a frame so that the frame includes the physical address, and wherein the second control unit removes the encapsulation tagged to the packet, and transfers the packet to the destination through the second PCI express bus by referring to a PCI express configuration register.

15 Claims, 21 Drawing Sheets

U.S. PATENT DOCUMENTS

| | | | |
|---|---|---|---|
| 7,356,636 B2 * | 4/2008 | Torudbakken et al. | 710/313 |
| 7,464,174 B1 * | 12/2008 | Ngai | 709/234 |
| 7,698,484 B2 * | 4/2010 | Ikeda et al. | 710/104 |
| 7,734,859 B2 * | 6/2010 | Daniel et al. | 710/315 |
| 7,917,681 B2 * | 3/2011 | Suzuki et al. | 710/312 |
| 7,917,682 B2 * | 3/2011 | Bakthavathsalam | 710/315 |
| 2005/0038947 A1 * | 2/2005 | Lueck et al. | 710/315 |
| 2005/0053060 A1 * | 3/2005 | Pettey | 370/385 |
| 2005/0125590 A1 * | 6/2005 | Li et al. | 710/317 |
| 2005/0262269 A1 * | 11/2005 | Pike | 710/1 |
| 2006/0112211 A1 * | 5/2006 | Sandy et al. | 710/315 |
| 2006/0126612 A1 * | 6/2006 | Sandy et al. | 370/389 |
| 2006/0206655 A1 * | 9/2006 | Chappell et al. | 710/315 |
| 2007/0071005 A1 * | 3/2007 | Mayhew et al. | 370/392 |
| 2008/0071961 A1 * | 3/2008 | Higuchi et al. | 710/312 |
| 2008/0195747 A1 * | 8/2008 | Elmaliah | 709/232 |

FOREIGN PATENT DOCUMENTS

| | | |
|---|---|---|
| JP | 2004-362544 | 12/2004 |
| JP | 2005-317021 | 11/2005 |
| JP | 2005-318581 | 11/2005 |
| JP | 2005-332396 | 12/2005 |
| WO | WO 95/20282 | 7/1995 |

OTHER PUBLICATIONS

Regula, Jack. Using Non-transparent Bridging in PCI Express Systems. Jun. 1, 2004.*

Rooholamini, Mo. Advanced Switching: a new take on PCI Express. EDN. Oct. 14, 2004.*

Hui et al. Ethernet Over PCI Express. Ethernet Summit. Mar. 5, 2012.*

Wikipedia, the free encyclopedia. Crossbar switch. hhttp://en.wikipedia.org/wiki/Crossbar_switch. Feb. 1, 2010.

Japanese Patent Office issued a Japanese Office Action dated Apr. 13, 2010, Application No. 2006-040228.

PCI Express Base Specification Revision 1.1, PCI-SIG, Mar. 28, 2005. pp. 29-34.

Protocol Interface #8 (PI-8) R1.0, ASI-SIG, Feb. 2004, pp. 7-11.

Fox, Kimkinyona: PCI Express Advanced Switching Encapsulation—Creating a universal fabric. Jun. 2003.

Intel Corporation, PCI Express* 3.0 Technology: PHY Implementation Considerations for Intel Platforms. Jul. 27, 2009.

Mayhew et al., PCI Express and Advanced Switching: Evolutionary Path to Building NExt Generation Interconnects. IEEE. 2003.

* cited by examiner

FIG.11

209: TLP ENCAPSULATING TABLE

| | 301 MAC ADDRESS | 302 BUS NUMBER | 303 DEVICE NUMBER | 304 I/O 32-BIT ADDRESS LOWER LIMIT | 305 I/O 32-BIT ADDRESS UPPER LIMIT | 306 MEMORY 32-BIT ADDRESS LOWER LIMIT | 307 MEMORY 32-BIT ADDRESS UPPER LIMIT | 308 MEMORY 64-BIT ADDRESS LOWER LIMIT | 309 MEMORY 64-BIT ADDRESS UPPER LIMIT |
|---|---|---|---|---|---|---|---|---|---|
| NIC1 | ○○○○ | △△△ | ▲▲▲ | | | | | | |
| NIC2 | ××× | □□□ | | | | | | | |
| STORAGE 1 | ■■■ | | | | | | | | |
| ... | ........ | ........ | ........ | ........ | ........ | ........ | ........ | ........ | ........ |
| PCI EXPRESS-NETWORK BRIDGE 1 | | | | | | | | | |
| PCI EXPRESS-NETWORK BRIDGE 2 | | | | | | | | | |
| PCI-PCI BRIDGE 1 | | | | | | | | | |
| PCI-PCI BRIDGE 2 | | | | | | | | | |
| PCI-PCI BRIDGE 3 | | | | | | | | | |

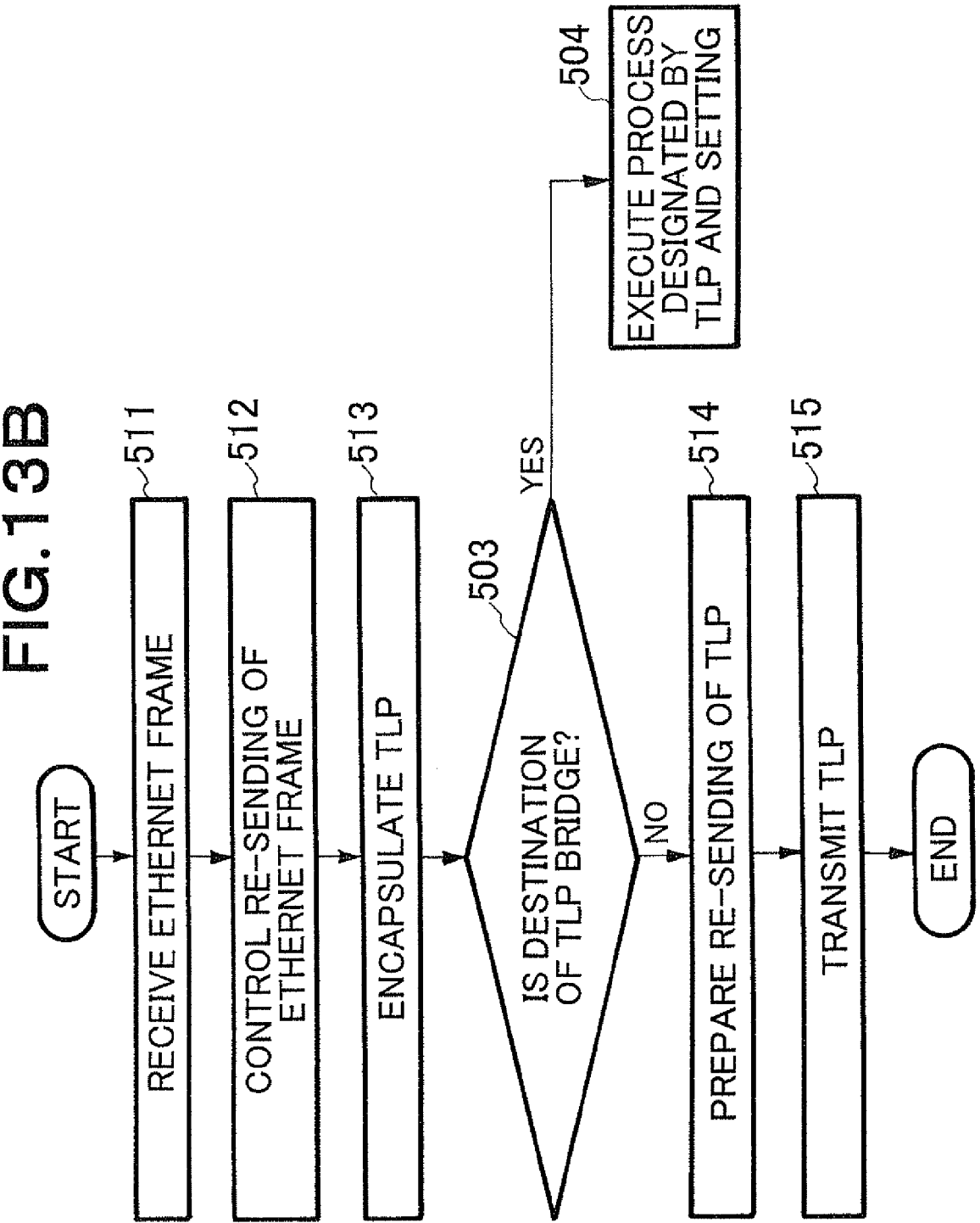

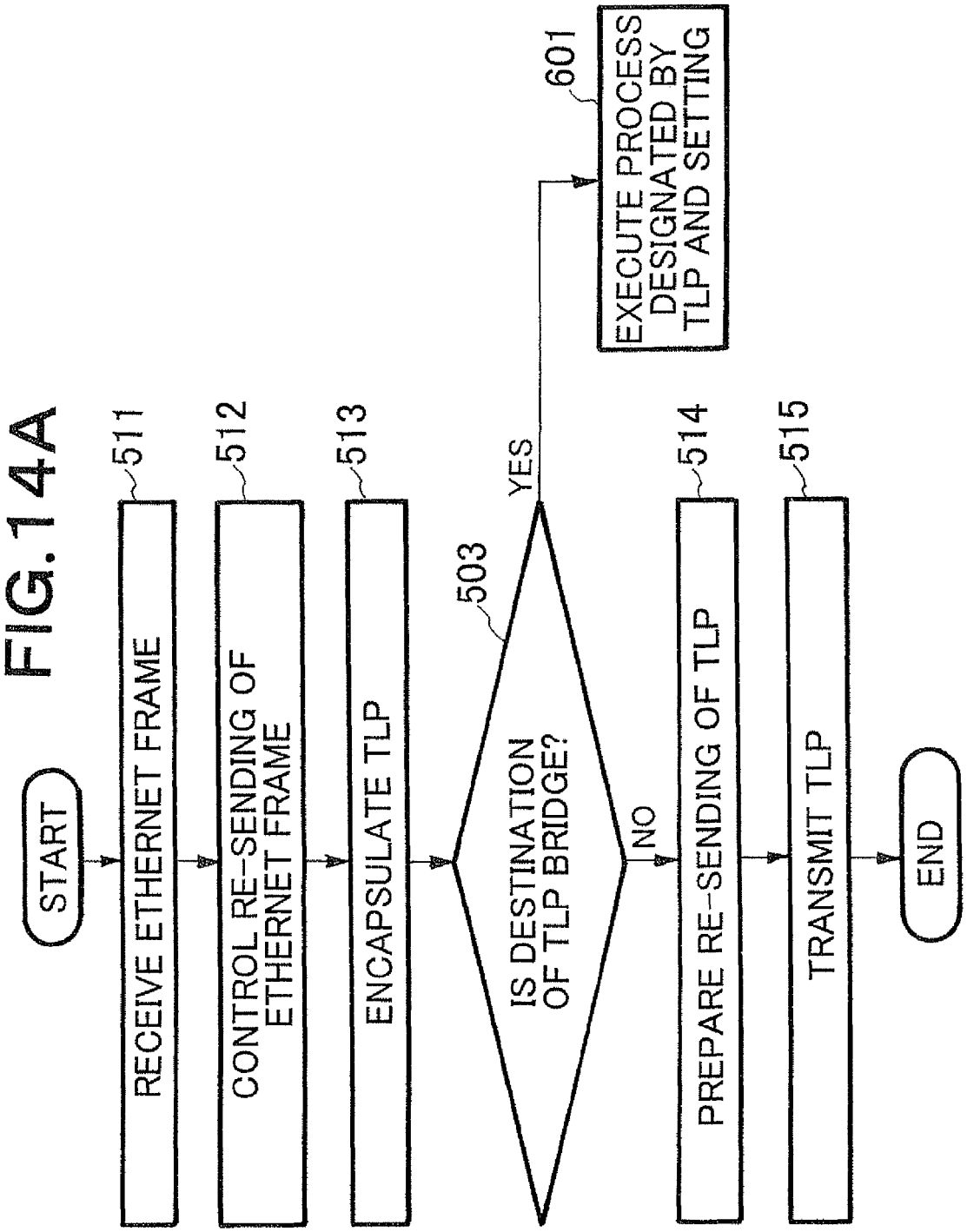

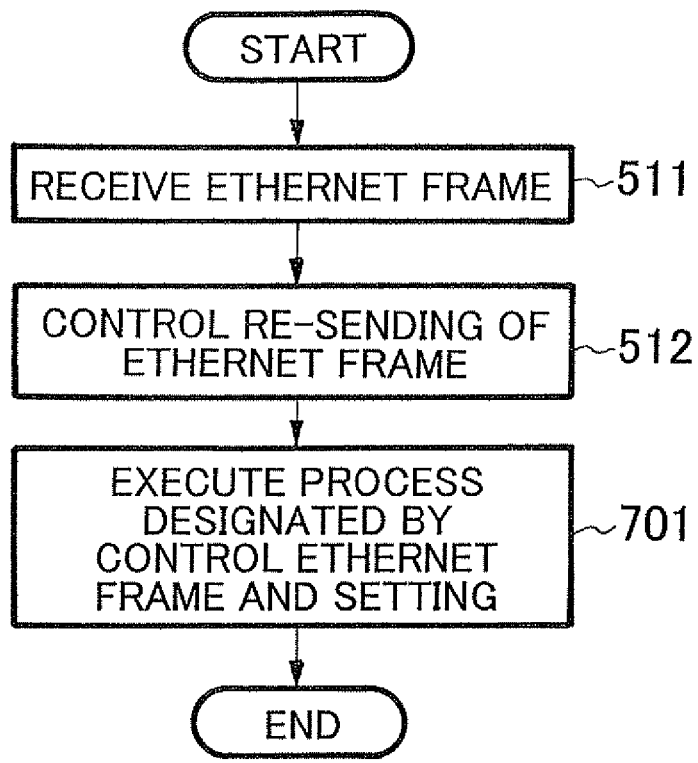
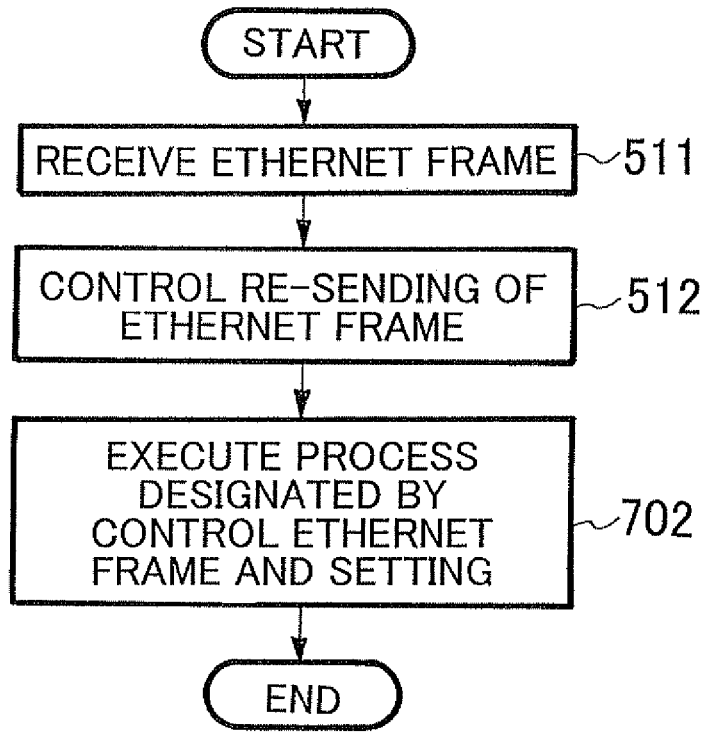

SWITCH AND NETWORK BRIDGE APPARATUS

This is a division of application Ser. No. 11/707,084.

BACKGROUND OF THE INVENTION

1. Field of the Invention

The present invention relates to a system in which a plurality of CPUs and peripheral devices are distributedly connected to a network to share the peripheral devices by the CPUs and, more particularly, to a system in which a plurality of CPUs and peripheral devices are connected through a PCI Express switch connected through a network.

2. Description of the Related Art

As a specification of a bus for connecting a central processing unit (CPU) to peripheral devices such as a storage device, a network interface (NIC), and the like, a peripheral component interconnect (PCI) is widely prevalent. As a next-generation specification for the PCI, a PCI Express which serializes a parallel bus of the PCI to perform communication by a packet system with switching is standardized. An example of a PCI Express switch network formed by the PCI Express is disclosed in PCI Express Base Specification Revision 1.1, PCI-SIG, Mar. 28, 2005, pp. 30.

Referring to FIG. 1, a PCI Express switch network described in PCI Express Base Specification Revision 1.1, PCI-SIG, Mar. 28, 2005, pp. 30 includes a CPU 101, a route complex 102 realized by a chipset, a memory 103, a PCI Express switch 801, and a peripheral device 109.

The CPU 101 and the route complex 102 are connected to each other and the route complex 102 and the memory 103 are connected to each other by a high-speed communication system different from the PCI Express. On the other hand, the route complex 102 and the PCI Express switch 801 are connected to each other by a PCI Express bus, and the PCI Express switch 801 and the peripheral device 109 are connected to each other by a PCI Express bus. These components communicate with each other by a communication system conforming to the PCI Express.

The route complex 102 receives an instruction from the CPU 101, performs transferring of peer-to-peer communication between the CPU 101 and the peripheral device 109 and peer-to-peer communication between the memory 103 and the peripheral device 109. At this time, communication is performed between the route complex 102 and the peripheral device 109 by using a packet (TLP: Transaction Layer Packet) of the PCI Express. Therefore, a PCI Express switch network forms a hierarchical network in which the route complex 102 and the peripheral device 109 are used as a tree-structure route and a leaf, respectively. In this sense, in the PCI Express switch network, the route complex 102 side is called an upstream side, and the peripheral device 109 side is called a down stream side.

The PCI Express switch 801 transfers TLPs received from respective ports of the switch to ports of the PCI Express switch 801 to which the destination route complex 102 and the peripheral device 109 are connected. An example of the configuration of the PCI Express switch 801 is described in PCI Express Base Specification Revision 1.1, PCI-SIG, Mar. 28, 2005, pp. 34.

Referring to FIG. 2, the PCI Express switch 801 described in PCI Express Base Specification Revision 1.1, PCI-SIG, Mar. 28, 2005, pp. 34 includes an upstream PCI-PCI bridge 1101 connected to the route complex 102, a downstream PCI-PCI bridge 1103 connected to the peripheral device 109, and a PCI Express switch internal bus 1102 which connects the upstream PCI-PCI bridge 1101 and the downstream PCI-PCI bridge 1103 to each other.

A TLP input from the upstream PCI-PCI bridge 1101 or the downstream PCI-PCI bridge 1103 is transmitted to the downstream PCI-PCI bridge 1103 or the upstream PCI-PCI bridge 1101 connected to a destination of the TLP through the PCI Express switch internal bus 1102.

Referring to FIG. 3A, the upstream PCI-PCI bridge 1101 includes a PCI Express adaptor 201 which terminates a link of a PCI Express bus for connecting the PCI Express adaptor 201 and the route complex 102 and which exchanges a TLP with a TLP transfer logic 205, the TLP transfer logic 205 which transfers the TLP to a destination of the TLP, an upstream PCI-PCI bridge control logic 1201 which performs a process designated by the TLP addressed to the bridge 1101 and setting of the bridge 1101, a PCI-PCI bridge configuration resister 207 which provides a PCI Express constitution space, and a PCI Express switch internal bus adapter 1202 which performs a process required to send the TLP to the destination in accordance with a mounting mode of the PCI Express switch internal bus 1102.

The PCI Express adapter 201 includes a PCI Express physical layer 202 which transmits and receives a signal by using a signal of a physical specification conforming to the standard of the PCI Express, a PCI Express data link layer 203 which performs re-sending control of a TLP, and a PCI Express transaction layer 204 which exchanges the TLP.

On the other hand, referring to FIG. 3B, the downstream PCI-PCI bridge 1103 is different from the upstream PCI-PCI bridge 1101 shown in FIG. 3A in that the downstream PCI-PCI bridge 1103 includes a downstream PCI-PCI bridge control logic 1203 in place of the upstream PCI-PCI bridge control logic 1201. This difference is to perform control, such as processes related to a hot plug and hot removal of the peripheral device 109 in the downstream PCI-PCI bridge 1103, which is different from control in the upstream PCI-PCI bridge 1101 in relation to a process designated by a TLP addressed to the bridge 1103.

A PCI Express switch network shown in FIG. 1, an arbitrary one of a plurality of peripheral devices 109 can be connected to the CPU 101. However, since the network forms a closed hierarchical structure, the peripheral device 109 cannot be shared by a plurality of CPUs 101.

As a conventional method of solving this problem, an advanced switching interconnect (ASI) which distributedly connects a plurality of CPUs 101 and a plurality of peripheral devices 109 to a network to dynamically set connection between the CPUs 101 and the peripheral devices 109 is standardized. An example of the ASI is described in Protocol Interface #8 (PI-8) R1.0, ASI-SIG, February 2004, pp. 7-11.

Referring to FIG. 4, an ASI network 1301 includes a route complex side PCI Express-ASI bridge 1302 which is connected to the route complex 102 and has a function of encapsulating a TLP in an ASI packet to transmit and receive the ASI packet, an ASI switch 1303 which transfers an ASI packet to a port to which a destination of the ASI packet obtained by encapsulating the TLP is connected, a peripheral device side PCI Express-ASI bridge 1305 which has a function of encapsulating the TLP in an ASI packet to transmit and receive the ASI packet, and a fabric manager 1304 which manages connection between the route complex side PCI Express-ASI bridge 1302 and the peripheral device side PCI Express-ASI bridge 1305.

In this case, each route complex side PCI Express-ASI bridge 1302 is constituted by a PCI Express switch 1401 and an ASI network adapter 1403, and the peripheral device side PCI Express-ASI bridge 1305 is constituted by the ASI network adapter 1403 and the PCI Express switch 1601.

Referring to FIG. 5, the PCI Express switch 1401 of the route complex side PCI Express-ASI bridge 1302 is different from the PCI Express switch 801 shown in FIG. 2 in that the route complex side PCI Express-ASI bridge 1302 includes a downstream PCI-PCI bridge 1402 in place of the downstream PCI-PCI bridge 1103. The downstream PCI-PCI bridge 1402, as shown in FIG. 6, corresponds to a bridge obtained by removing the PCI Express adapter 201 from the downstream PCI-PCI bridge 1103. The downstream PCI-PCI bridge 1402 is directly connected by an internal bus because the PCI Express switch 1401 and the ASI network adapter 1403 are mounted in the same chip. The ASI network adapter 1403 has a function of encapsulating a TLP by using an ASI packet determined for each port of the PCI Express switch 1401 to transmit and receive the ASI packet.

On the other hand, referring to FIG. 7, the PCI Express switch 1601 of the peripheral device side PCI Express-ASI bridge 1305 is constituted by an upstream PCI-PCI bridge 1602 connected to the ASI network adapter 1403 and the downstream PCI-PCI bridge 1103 connected to the upstream PCI-PCI bridge 1602. The downstream PCI-PCI bridge 1103 has a configuration shown in FIG. 3B. In contrast to this, the upstream PCI-PCI bridge 1602, as shown in FIG. 8, corresponds to a bridge obtained by removing the PCI Express adapter 201 from the upstream PCI-PCI bridge 1101 shown in FIG. 3A. This is because, as in the downstream PCI-PCI bridge 1402 shown in FIG. 5, the ASI network adapter 1403 and the upstream PCI-PCI bridge 1602 are directly connected to each other by an internal bus. In FIG. 7, although one downstream PCI-PCI bridge 1103 is used for descriptive convenience, the number of downstream PCI-PCI bridges 1103 is not limited to one.

The fabric manager 1304 sets the ASI network adapters 1403 of both the bridges 1302 and 1305 to encapsulate a TLP in an ASI packet to perform tunneling between the downstream PCI-PCI bridge 1402 in the PCI Express switch 1401 of the route complex side PCI Express-ASI bridge 1302 and the upstream PCI-PCI bridge 1602 in the PCI Express switch 1601 of the peripheral device side PCI Express-ASI bridge 1305. This setting is performed by using a control ASI packet. In this case, by an application program operated on the CPU 101 or a request from an input/output interface, connections between the downstream PCI-PCI bridge 1402 and the upstream PCI-PCI bridge 1602 are changed as needed. With this operation, the plurality of peripheral devices 109 are shared by the plurality of CPUs 101.

As described above, by using the ASI network 1301 shown in FIG. 4, the peripheral devices can be shared by the plurality of CPUs. Furthermore, the ASI network is made on the assumption that the PCI Express switch shown in FIG. 2 is utilized. Even though a connection is performed to make it possible that three peripheral devices are shared by two CPUs, two PCI Express switches 1401, in each of which the total number of bridges is four and three PCI Express switches 1601, in each of which the total number of bridges is two, i.e., a total of five PCI Express switches are required. As a result, the total number of bridges is 14. In general, a connection is performed to make it possible to share m peripheral devices by n CPUs, a total of n(1+m)+2 m bridges are required. For this reason, in order to construct a system in which CPUs and peripheral devices are distributedly connected to a network, a circuit for bridges to connect the CPUs and the peripheral devices to the network disadvantageously increase in scale.

SUMMARY OF THE INVENTION

It is an object of the present invention that, in a system in which a plurality of CPUs and a peripheral device are distributedly connected to a network to share the peripheral device by the CPUs, a circuit scale for bridges to connect the CPUs and the peripheral device to the network.

A network bridge apparatus includes a PCI Express adaptor which terminates a link of a PCI Express bus, a PCI network adapter which terminates a link to the network, and a control unit which is arranged between the PCI Express adapter and the network adapter and encapsules a TLP in a frame of the link having, as a destination, a physical address of a bridge to which a destination of the TLP is connected to transmit and receive the frame. In a switch according to the present invention, the network bridge apparatus according to the present invention is used as upstream and downstream PCI Express-network bridge, and a plurality of upstream PCI Express-network bridges and a plurality of downstream PCI Express-network bridges are connected through the network.

As the network, for example, the Ethernet can be used. In this case, a physical address is a MAC address. The Ethernet may be constituted by one Ethernet switch or a plurality of Ethernet switches. A network except for the Ethernet can be similarly constituted by a layer 2 switch or more.

The network bridge apparatus according to the present invention has, in place of a terminating function of a PCI Express bus, a terminating function of a link to a network such as an Ethernet, and a function of encapsulating a TLP in a frame of the link having, as a destination, a physical address of a bridge to which a destination of the TLP is connected to transmit and receive the frame. For this reason, by only the bridge apparatus, a function equivalent to that of the route complex side PCI Express-ASI bridge 1302 or the peripheral device side PCI Express-ASI bridge 1305 shown in FIG. 4 can be achieved.

According to the present invention, in a system in which a plurality of CPUs and a peripheral device are distributedly connected to a network to share the peripheral device by the plurality of CPUs, a circuit scale of a bridge to connect the CPUs and the peripheral device to the network can be considerably reduced. This is because the network bridge apparatus according to the present invention can be realized in a scale to the extent that circuits related to encapsulating and decapsulating of a TLP are added to a circuit of an upstream or downstream PCI-PCI bridge in a conventional PCI Express switch. In the switch according to the present invention, the total number of bridges may be five when a connection is performed such that three peripheral devices can be shared by two CPUs. In general, when a connection is performed such that m peripheral devices can be shared by n CPUs, the total number of bridges may be n+m.

Because the switch according to the present invention comprising a plurality of upstream PCI Express-network bridges and a plurality of downstream PCI Express-network bridges connected to the plurality of upstream PCI Express network bridges through a network is equivalent to a conventional PCI Express switch, it is needless to change a conventional PCI software.

BRIEF DESCRIPTION OF THE DRAWINGS

FIG. 13B is a flow chart showing an operation performed when the upstream PCI Express-Ethernet bridge receives an Ethernet frame;

FIG. 14A is a flow chart showing an operation performed when the downstream PCI Express-Ethernet bridge receives an Ethernet frame;

FIG. 15A is a flow chart showing an operation performed when the upstream PCI Express-Ethernet bridge receives a control Ethernet frame from a system manager;

FIG. 15B is a flow chart showing an operation performed when the downstream PCI Express-Ethernet bridge receives a control Ethernet frame from the system manager;

DESCRIPTION OF THE PREFERRED EMBODIMENTS

Best modes to carry out the present invention will be described below in detail with reference to the accompanying drawings.

Embodiment 1

Figure 9:
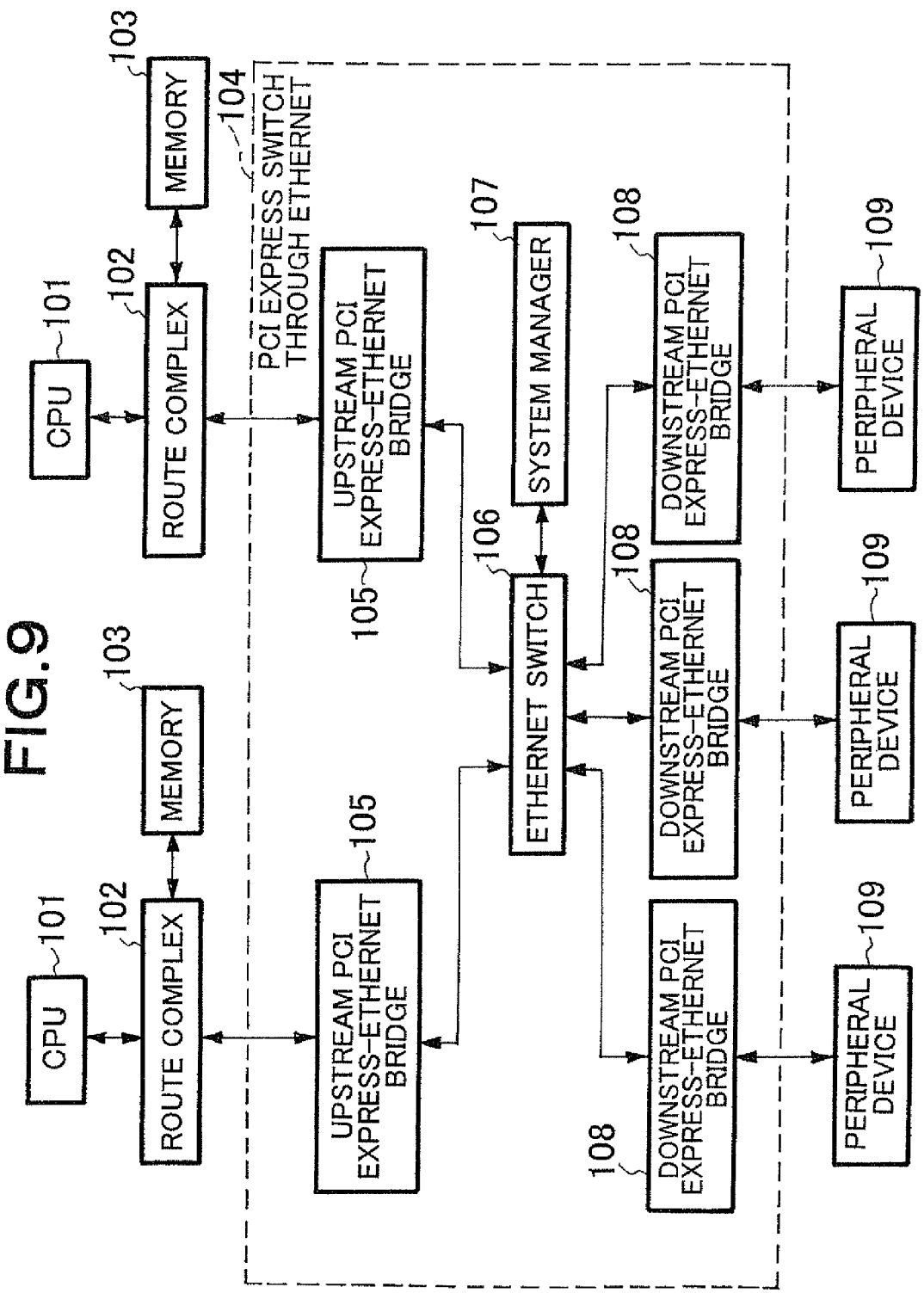
FIG. 9 is a block diagram of a first embodiment of the present invention.

Referring to FIG. 9, a first embodiment of the present invention includes two CPUs 101, two route complexes 102 realized by a chipset, two memories 103, a PCI Express switch 104 connected through an Ethernet, and three peripheral devices 109. In the embodiment, three peripheral devices 109 can be shared by the two CPUs 101.

The PCI Express switch 104 includes two upstream PCI Express-Ethernet bridges 105, each of which is connected to the route complex 102, has a MAC address, and has a function of encapsulating a TLP in an Ethernet frame to transmit and receive the Ethernet frame, one Ethernet switch 106 which transfers the Ethernet frame to a port to which a destination of the Ethernet frame obtained by encapsulating the TLP is connected, three downstream PCI Express-Ethernet bridges 108, each of which is connected to the peripheral device 109, holds a MAC address, and encapsulates a TLP in an Ethernet frame to transmit and receive the Ethernet frame, and a system manager 107 which manages a connection of the downstream PCI Express-Ethernet bridge 108 to a specific one of the upstream PCI Express-Ethernet bridges 105. The PCI Express switch 104 connected through the Ethernet provides the same interface as that of a conventional PCI Express switch to the PCI Express switch network connected to the PCI Express switch 104 to make it possible to use software related to a conventional PCI.

Figure 10:
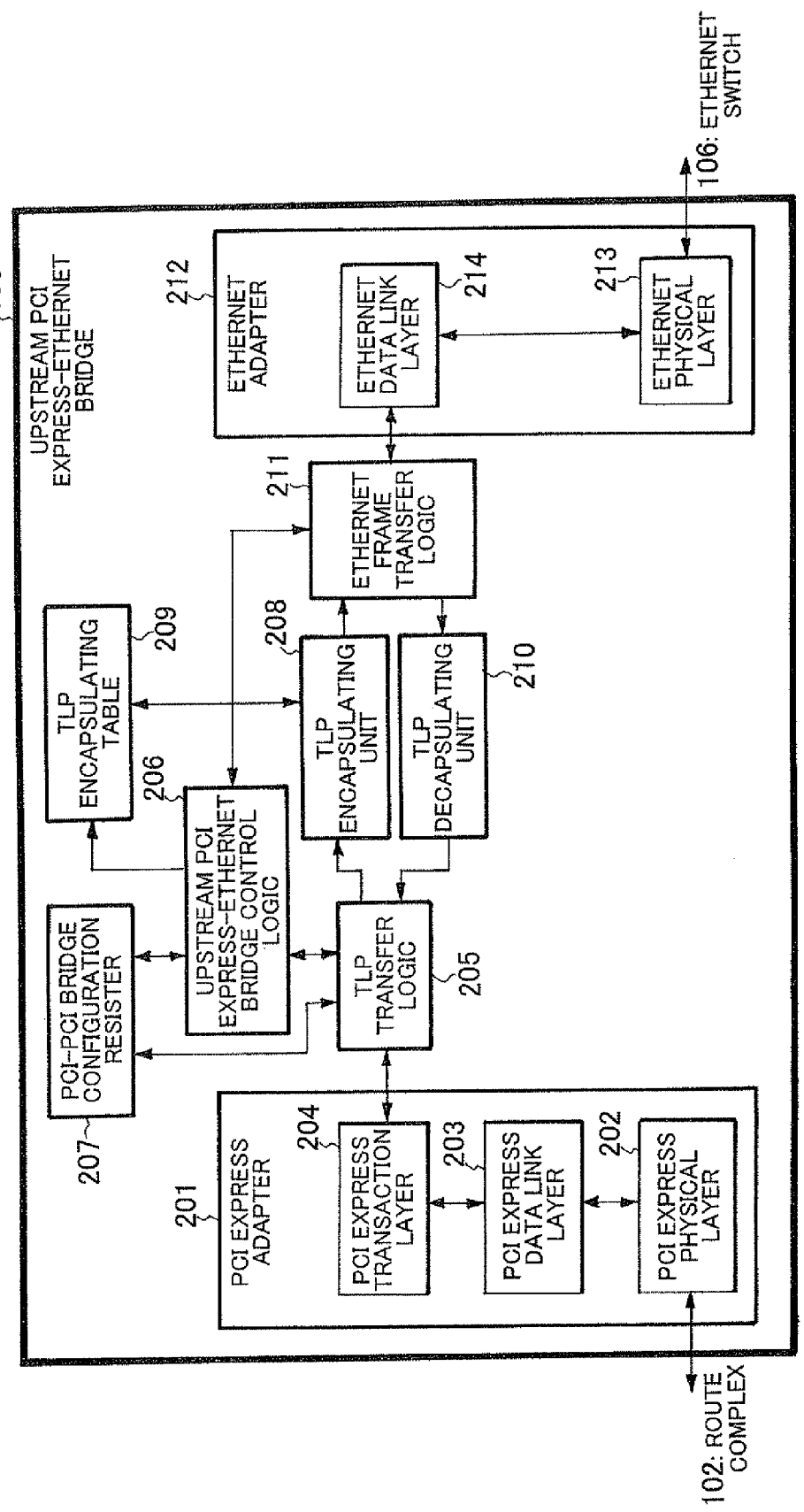
FIG. 10A is a block diagram showing an internal configuration of an upstream PCI Express-Ethernet bridge.
FIG. 10B is a block diagram showing an internal configuration of a downstream PCI Express-Ethernet bridge.

Referring to FIG. 10A, the upstream PCI Express-Ethernet bridge 105 includes a PCI Express adapter 201 which terminates a link of a PCI Express bus for connecting the upstream PCI Express-Ethernet bridge 105 to the route complex 102, a TLP transfer logic 205 which transfers a TLP to a destination of the TLP, an upstream PCI Express-Ethernet bridge control logic 206 which performs a process designated by the TLP addressed to the bridge 105 and setting of the bridge, a PCI-PCI bridge configuration resister 207 which provides a PCI Express configuration space determined by the standard of the PCI Express, a TLP encapsulating unit 208 which detects a destination of the TLP, searches for a MAC address of the downstream PCI Express-Ethernet bridge 108 corresponding to the destination, and encapsulates the TLP in an Ethernet frame by using the MAC address, a TLP encapsulating table 209 which holds information of the MAC address corresponding to the designation of the TLP, a TLP decapsulating unit 210 which decapsulates the TLP from the encapsulated Ethernet frame, an Ethernet frame transfer logic 211 which transfers the Ethernet frame to the destination of the Ethernet frame, and an Ethernet adapter 212 which terminates a link for connecting the upstream PCI Express-Ethernet bridge 105 to the Ethernet switch 106.

The PCI Express adapter 201 includes a PCI Express physical layer 202 which transmits and receives a signal by using a signal of a physical specification conforming the standard of the PCI Express, a PCI Express data link layer 203 which performs re-sending control of a TLP, and a PCI Express transaction layer 204 which exchanges the TLP.

The Ethernet adapter 212 includes an Ethernet physical layer 213 which transmits and receives a signal by using a signal of a physical specification conforming to the standard of the Ethernet and an Ethernet data link layer 214 which provides a function of filtering an Ethernet frame addressed to the Ethernet adapter 212 and a re-sending control function of the Ethernet frame to the received Ethernet frame.

Referring to FIG. 10B, the downstream PCI Express-Ethernet bridge 108 is different from the upstream PCI Express-Ethernet bridge 105 in that the downstream PCI Express-Ethernet bridge 108 includes a downstream PCI Express-Ethernet bridge control logic 215 in place of the upstream PCI Express-Ethernet bridge control logic 206. This is because the downstream PCI Express-Ethernet bridge 108 is different from the upstream PCI Express-Ethernet bridge 105 in the following points related to processes designated by a TLP addressed to the bridge 108 or the control Ethernet frame and setting of the bridge 108 such as processes related to a hot plug and hot removal of the peripheral device 109, and a method of forming the TLP encapsulating table 209.

Figure 11:
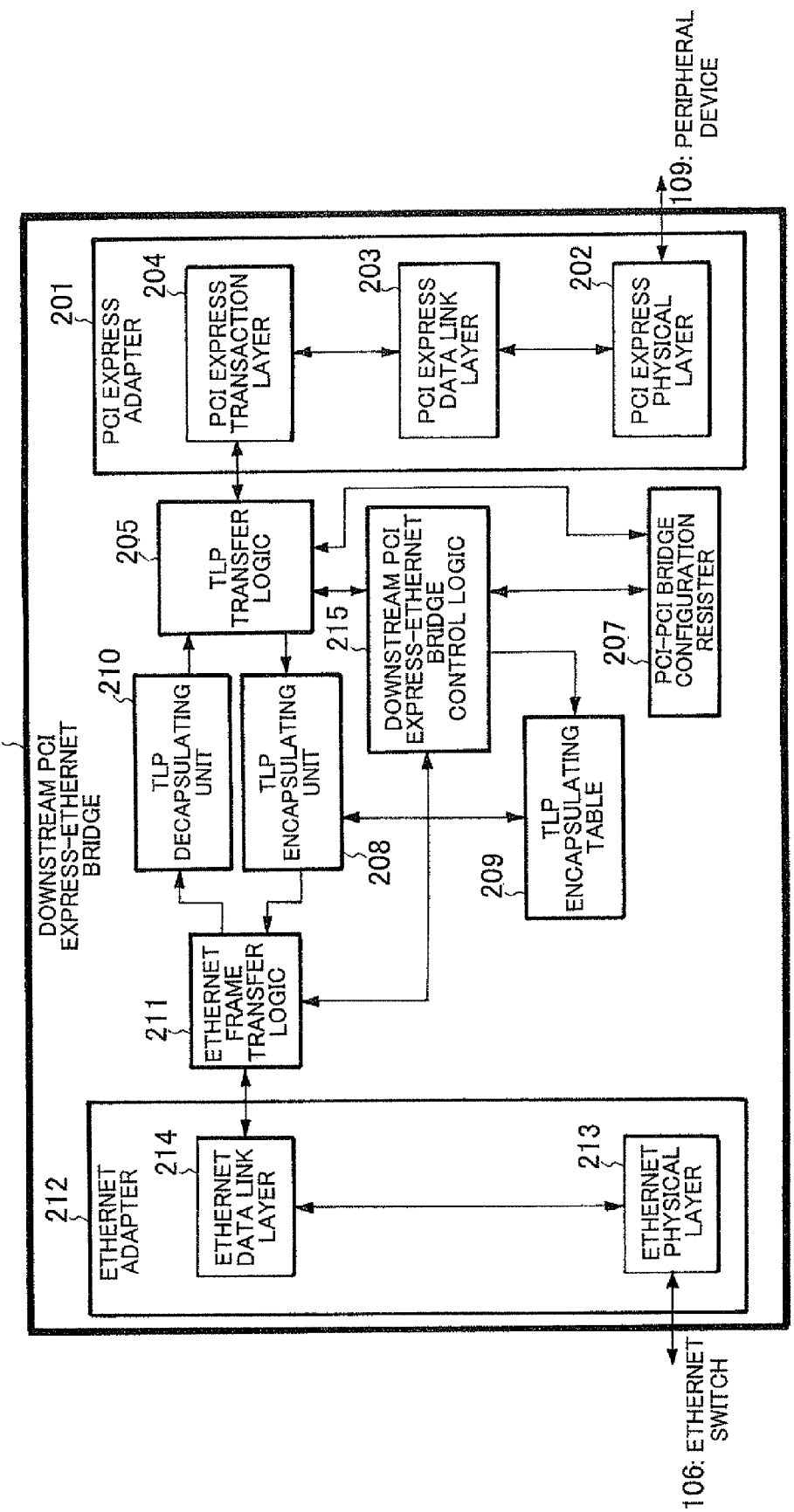
FIG. 11 is a diagram showing a configuration of a TLP encapsulating table.

Referring to FIG. 11, the TLP encapsulating table 209 is a table which holds a correspondence between a MAC address 301 and destination information included in a header of the TLP. In an example shown in FIG. 11, as pieces of destination information, a bus number 302, a device number 303, an I/O 32-bit address lower limit 304, an I/O 32-bit address upper limit 305, a memory 32-bit address lower limit 306, a memory 32-bit address upper limit 307, a memory 64-bit address lower limit 308, and a memory 64-bit address upper limit 309 can be set.

In the PCI Express, as methods of specifying a transfer destination of a TLP by an expression of a header of the TLP, two types of methods, i.e., ID routing and address routing are defined. The ID routing is a method which designates a number of a bus to which a destination is connected, a device number allocated to identify a device in the same bus, and a function number allocated to each function in a device to specify the destination. When a destination of a TLP is designated by the ID routing, columns for the bus number 302 and the device number 303 on the TLP encapsulating table 209 are used to know the MAC address 301 of the upstream PCI Express-Ethernet bridge 105 or the downstream PCI Express-Ethernet bridge 108 (bridge itself when the destination is the upstream PCI Express-Ethernet bridge 105 or the downstream PCI Express-Ethernet bridge 108) to which a peripheral device or the like of the destination is connected. In this case, a function number of the destination is omitted because the function number is not required to coordinate the MAC address 301.

On the other hand, the address routing is a method which specifies a destination to designate an I/O space or a memory space allocated to a peripheral device serving as a destination to specify the destination. When a destination of a TLP is designated by ID routing, columns for the I/O 32-bit address lower limit 304, the I/O 32-bit address upper limit 305, the memory 32-bit address lower limit 306, the memory 32-bit address upper limit 307, the memory 64-bit address lower limit 308, and the memory 64-bit address upper limit 309 on the TLP encapsulating table 209 are used to know the MAC address 301 of the upstream PCI Express-Ethernet bridge 105 or the downstream PCI Express-Ethernet bridge 108 (bridge itself when the destination is the upstream PCI Express-Ethernet bridge 105 or the downstream PCI Express-Ethernet bridge 108) to which a peripheral device or the like of the destination is connected. In this case, all the I/O 32-bit address lower limit 304 and the I/O 32-bit address upper limit 305 which are a lower limit value and an upper limit value in an I/O space allocated to the destination, the memory 32-bit address lower limit 306 and the memory 32-bit address upper limit 307 which are a lower limit value and an upper limit value in a 32-bit memory space, and the memory 64-bit address lower limit 308 and the memory 64-bit address upper limit 309 which are a lower limit value and an upper limit value in a 64-bit memory space are not set, and only values corresponding to the devices of the destination are set.

The system manager 107 allocates the peripheral device 109 to one CPU 101 of a plurality of CPUs 101 connected to an Ethernet (Ethernet switch 106) on the basis of application software operated on the CPU 101 and a request from an input/output interface. This allocation is performed by connecting the downstream PCI Express-Ethernet bridge 108 to the upstream PCI Express-Ethernet bridge 105 corresponding to the CPU 101 serving as a connection target. An instruction of connection to each bridge is performed by a control Ethernet frame. At this time, a MAC address of a destination for connection is notified. After the connection is set, a process related to the connection is performed in the upstream PCI Express-Ethernet bridge 105 and the downstream PCI Express-Ethernet bridge 108, and the CPU 101 can use the allocated peripheral device 109. The details of these operations will be described later.

Figure 12:
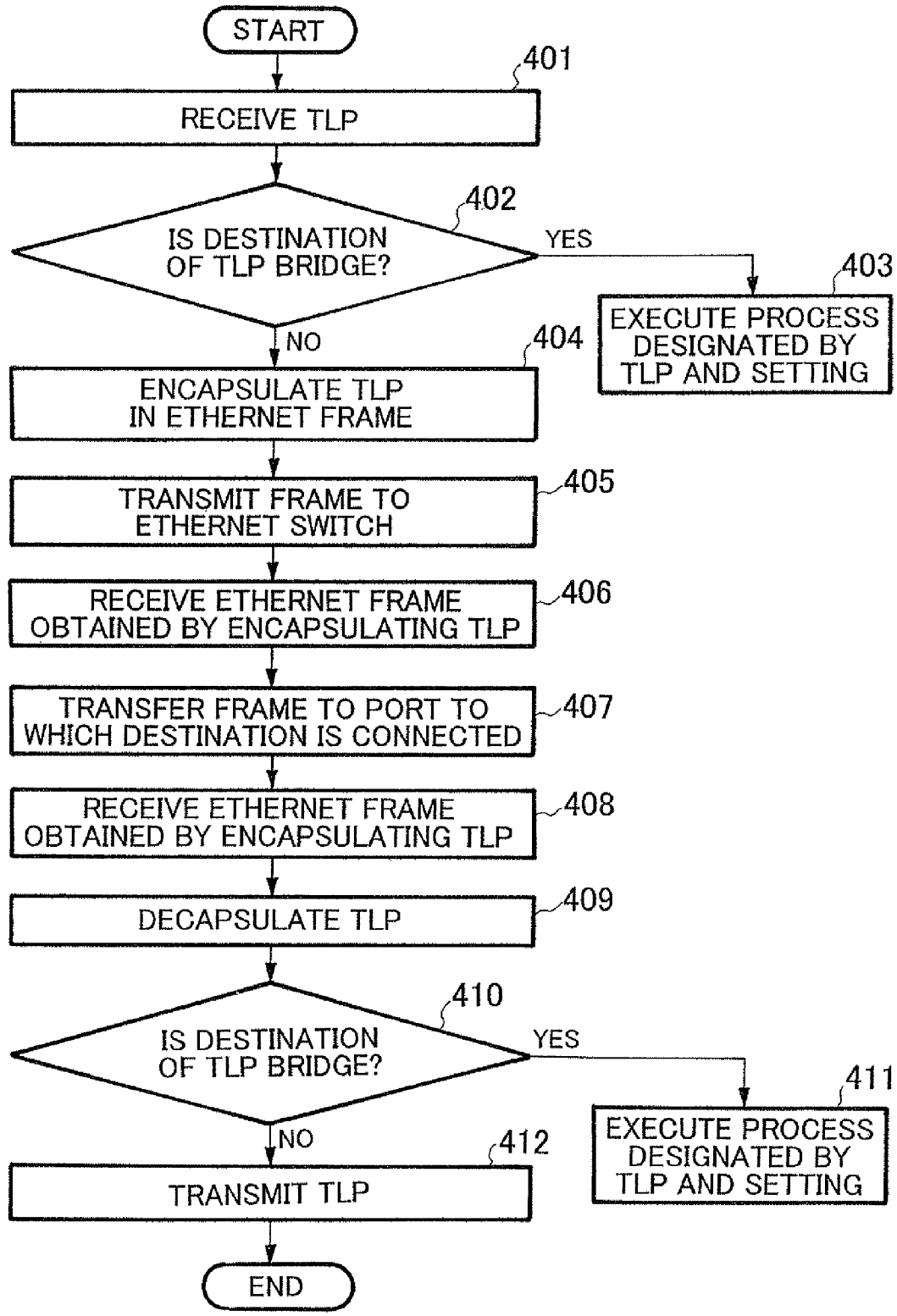
FIG. 12 is a flow chart showing a schematic operation of a first embodiment of the present invention.

An outline of operations in the embodiment will be described below with reference to FIGS. 9 and 12.

A transfer operation of a TLP from an upstream to a downstream will be described below. When the upstream PCI Express-Ethernet bridge 105 receives a TLP from the route complex 102 (step 401) to check whether the destination of the TLP is the corresponding bridge 105 (step 402). When the destination of the TLP is the bridge 105, the TLP is stored to perform a process designated by the TLP or setting of the bridge 105 (step 403). On the other hand, when the destination of the TLP is the downstream PCI Express-Ethernet bridge 108 or the peripheral device 109, by using the MAC address of the downstream PCI Express-Ethernet bridge 108 (the downstream PCI Express-Ethernet bridge 108 itself when the destination is the downstream PCI Express-Ethernet bridge 108) to which the destination is connected, the TLP is encapsulated in an Ethernet frame (step 404) to transmit the Ethernet frame to the Ethernet switch 106 (step 405).

The Ethernet switch 106 receives the Ethernet frame obtained by encapsulating the TLP (step 406) and transfers the Ethernet frame to a port of the Ethernet switch 106 to which the downstream PCI Express-Ethernet bridge 108 having a destination MAC address described in the frame is connected (step 407).

The downstream PCI Express-Ethernet bridge 108 receives the Ethernet frame obtained by encapsulating the TLP from the Ethernet switch 106 (step 408), decapsulates the TLP (step 409), and checks whether the destination of the TLP is the bridge 108 (step 410). When the destination of the TLP is the bridge 108, the TLP is stored, processes designated by the TLP and setting of the bridge 108 are performed (step 411). On the other hand the destination of the TLP is the peripheral device 109, the TLP is transmitted to the peripheral device 109 (step 412).

A transfer operation from the downstream to the upstream will be explained. When the TLP is transmitted from the peripheral device 109 to the route complex 102, the upstream PCI Express-Ethernet bridge 105, or the downstream PCI Express-Ethernet bridge 108, the downstream PCI Express-Ethernet bridge 108 which receives the TLP from the peripheral device 109 performs the operations in step 401 to step 405 in FIG. 12, and the upstream PCI Express-Ethernet bridge 105 which receives the Ethernet frame obtained by encapsulating the TLP from the Ethernet switch 106 performs the operations in step 408 to step 412.

Figure 13A:
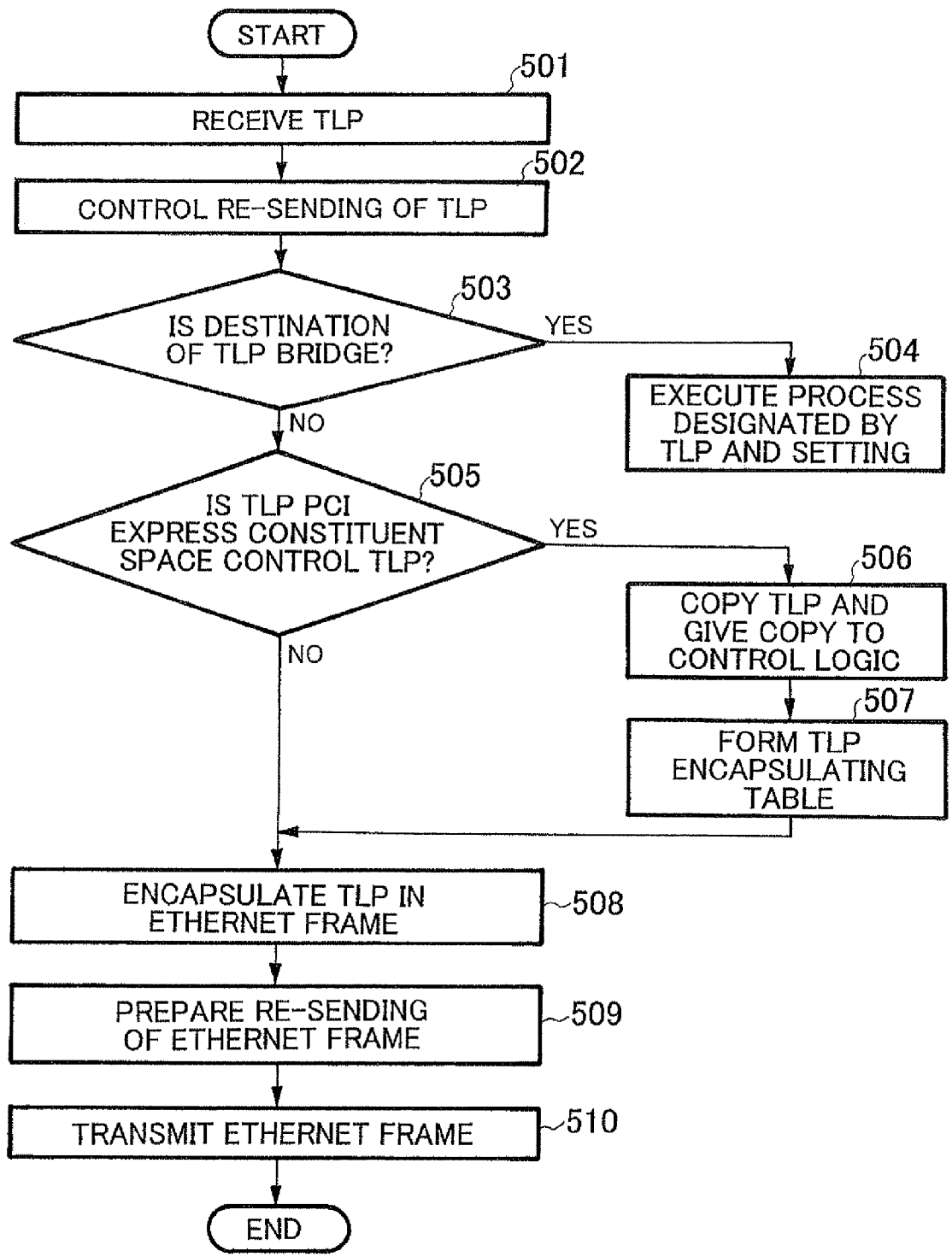
FIG. 13A is a flow chart showing an operation performed when the upstream PCI Express-Ethernet bridge receives a TLP.

The operations in the embodiment will be described in detail. Referring to FIGS. 10A and 13A, in the upstream PCI Express-Ethernet bridge 105, an operation which encapsulates a TLP received from the route complex 102 in an Ethernet frame to send the Ethernet frame to the Ethernet switch 106 and an operation which stores a TLP received from the route complex 102 and addressed to the bridge 105 will be described in detail.

The PCI Express physical layer 202 receives signals which transmit a TLP and collects the signals in a unit of packet (step 501). The PCI Express data link layer 203 receives a combination of the TLP, a packet number (sequence number) allocated to the TLP, and an error detection code. An unreceived TLP which is found out by discontinuity of packet numbers or a TLP in which a code error is generated requests a transmission side to re-send the TLP (step 502). the PCI Express transaction layer 204 receives the TLP from the PCI Express data link layer 203 and gives the TLP to the TLP transfer logic 205.

The TLP transfer logic 205 detects a designation of the TLP to check whether the destination of the upstream PCI Express-Ethernet bridge 105 itself, the downstream PCI Express-Ethernet bridge 108 connected to the downstream of the bridge with reference to the PCI-PCI bridge configuration resister 207 (step 503).

The upstream PCI Express-Ethernet bridge control logic 206 receives the TLP, the destination of which is the upstream PCI Express-Ethernet bridge 105 itself from the TLP transfer logic 205 to execute processes designated by the TLP and setting of the bridge 105 itself (step 504). These processes and setting include writing in the PCI-PCI bridge configuration resister 207.

The TLP transfer logic 205 detects a TLP of a type which controls a PCI Express configuration space in TLPs the destinations are the downstream PCI Express-Ethernet bridge 108 and the peripheral device 109 (step 505) and copies the TLP to give the copy to the upstream PCI Express-Ethernet bridge control logic 206 (step 506). The upstream PCI Express-Ethernet bridge control logic 206 detects a bus number, a device number, an I/O space, or a memory space allocated to the downstream PCI Express-Ethernet bridge 108 and the peripheral device 109 from the contents of the received PCI Express configuration space control TLP to form the TLP encapsulating table 209 (step 507). In formation of the TLP encapsulating table 209, in addition to the information given by the PCI Express configuration space control TLP, information of a MAC address of a destination for connection given as a control Ethernet frame by the system manager 107 is used.

For example, it is assumed that a PCI Express configuration space control TLP which allocates a bus number Bx and a device number Dx to a certain peripheral device 109 and that a MAC address Mx is notified by a control Ethernet frame from the system manager 107 as the MAC address of the downstream PCI Express-Ethernet bridge 108 to which the peripheral device 109 is connected. In this case, the upstream PCI Express-Ethernet bridge control logic 206 registers correspondences between the MAC address Mx, the bus number Bx, and the device number Dx in the TLP encapsulating table 209.

The TLP transfer logic 205 may partially rewrite a TLP to be transferred as needed. This operation includes an operation of changing types of the PCI Express configuration space control TLP.

The TLP encapsulating unit 208 receives a TLP, the destination of which is the downstream PCI Express-Ethernet bridge 108 or the peripheral device 109 connected to the downstream of the upstream PCI Express-Ethernet bridge 105 and searches the TLP encapsulating table 209 by using destination information included in a header of the TLP as a key to acquire a MAC address of the downstream PCI Express-Ethernet bridge 108 (the downstream PCI Express-Ethernet bridge 108 itself when the destination is the downstream PCI Express-Ethernet bridge 108) to which the destination is connected. The TLP encapsulating unit 208 encapsulates the TLP in an Ethernet frame by using the MAC address (step 508).

The Ethernet frame transfer logic 211 receives the encapsulated Ethernet frame from the TLP encapsulating unit 208 to give the Ethernet frame to the Ethernet data link layer 214. The Ethernet data link layer 214 copies and holds the Ethernet frame in preparation for a re-sending request of the Ethernet frame obtained by encapsulating the TLP (step 509). The Ethernet physical layer 213 receives the Ethernet frame from the Ethernet data link layer 214 to transmit the Ethernet frame to the Ethernet switch 106 (step 510).

Referring to FIGS. 10A and 13B, in the upstream PCI Express-Ethernet bridge 105, an operation which receives an Ethernet frame obtained by encapsulating a TLP from the Ethernet switch 106, decapsulates the TLP, and transmits the TLP to the route complex 102 and an operation which receives an Ethernet frame obtained by encapsulating a TLP addressed to the bridge 105 from the Ethernet switch 106, decapsulates the TLP, and stores the TLP will be described below.

The Ethernet physical layer 213 receives the Ethernet frame obtained by encapsulating the TLP from the Ethernet switch 106 (step 511). The Ethernet data link layer 214 receives the Ethernet frame from the Ethernet physical layer 213 to check a frame number and an error detection code described in the frame. An unreceived Ethernet frame or an Ethernet frame in which a code error occurs, the Ethernet frames being found out by discontinuity of packet numbers, requests the transmission side to re-send the Ethernet frame (step 512).

The Ethernet frame transfer logic 211 receives the Ethernet frame obtained by encapsulating the TLP from the Ethernet data link layer 214 to give the Ethernet frame to the TLP decapsulating unit 210.

The TLP decapsulating unit 210 decapsulates the TLP from the Ethernet frame obtained by encapsulating the TLP to give the TLP to the TLP transfer logic 205 (step 513).

The operations in steps 503 and 504 are the same as those in FIG. 13A. More specifically, the TLP transfer logic 205 checks whether a destination of a TLP is the bridge 105 itself. When the TLP is addressed to the bridge 105, the TLP is transferred to the upstream PCI Express-Ethernet bridge control logic 206 to execute the processes designated by the TLP or the setting of the upstream PCI Express-Ethernet bridge 105. When the TLP is addressed to an address except for the bridge 105, the TLP is transferred to the PCI Express transaction layer 204.

The PCI Express data link layer 203 receives the TLP from the TLP transfer logic 205 through the PCI Express transaction layer 204 to copy the TLP in preparation for re-sending of the TLP (step 514). The PCI Express physical layer 202 receives the TLP from the PCI Express data link layer 203 to transmit the TLP to the route complex 102 (step 515).

The upstream PCI Express-Ethernet bridge control logic 206 may form the TLP to issue the TLP. As a result in step 504, the TLP may be returned. In this case, the formed TLP is given to the TLP transfer logic 205 and transmitted to the Ethernet switch 106 by the same procedures as those in steps 508 to 510 in FIG. 13A or transmitted to the route complex 102 by the same procedures as those in steps 514 and 515 in FIG. 13B.

Referring to FIGS. 10B and 14A, in the downstream PCI Express-Ethernet bridge 108, an operation which receives an Ethernet frame obtained by encapsulating a TLP from the Ethernet switch 106, decapsulates the TLP, and transmits the TLP to the peripheral device 109 and an operation which receives an Ethernet frame obtained by encapsulating a TLP addressed to the downstream PCI Express-Ethernet bridge 108, decapsulates the TLP and stores the TLP will be described below in detail.

Of the operations shown in FIG. 14A, the operations in steps except for step 601 are the same as those in the upstream PCI Express-Ethernet bridge 105 shown in FIG. 13B. In step 601, the downstream PCI Express-Ethernet bridge control logic 215 receives a TLP, the destination of which is the bridge 108 itself from the Ethernet frame transfer logic 211 and executes processes designated by the TLP and setting of the bridge 108. These processes and setting include reading from and writing in the PCI-PCI bridge configuration resister 207.

Furthermore, step 601 may include formation of the TLP encapsulating table 209. When the downstream PCI Express-Ethernet bridge 108 provides only communication between the CPU 101 and the peripheral device 109, the TLP encapsulating table 209 holds only the MAC address of the upstream PCI Express-Ethernet bridge 105 to which the downstream PCI Express-Ethernet bridge 108 is connected, and this information is obtained from a control Ethernet frame issued by the system manager 107. On the other hand, when the downstream PCI Express-Ethernet bridge 108 provides communication between the CPU 101 and another peripheral device 109 through the Ethernet switch 106, the TLP encapsulating table 209 includes a MAC address of another downstream PCI Express-Ethernet bridge 108 and information related to the configuration of a PCI Express switch network connected to the other downstream PCI Express-Ethernet bridge 108. In this case, the information related to the MAC address is acquired from the control Ethernet frame, and the information related to the configuration of the PCI Express switch network can be received from a TLP issued by the upstream PCI Express-Ethernet bridge control logic 206 and addressed to the downstream PCI Express-Ethernet bridge 108. At this time, in step 601, the TLP encapsulating table 209 is formed from the TLP issued by the upstream PCI Express-Ethernet bridge control logic 206.

For example, when a TLP which notifies that a bus number By and a device number Dy are allocated to another peripheral device 109 is issued from the upstream PCI Express-Ethernet bridge control logic 206, the downstream PCI Express-Ethernet bridge control logic 215, when a MAC address of the downstream PCI Express-Ethernet bridge 108 to which the other peripheral device 109 is connected is a MAC address My, registers correspondences between the MAC address My, the bus number By, and the device number Dy.

Figure 14B:
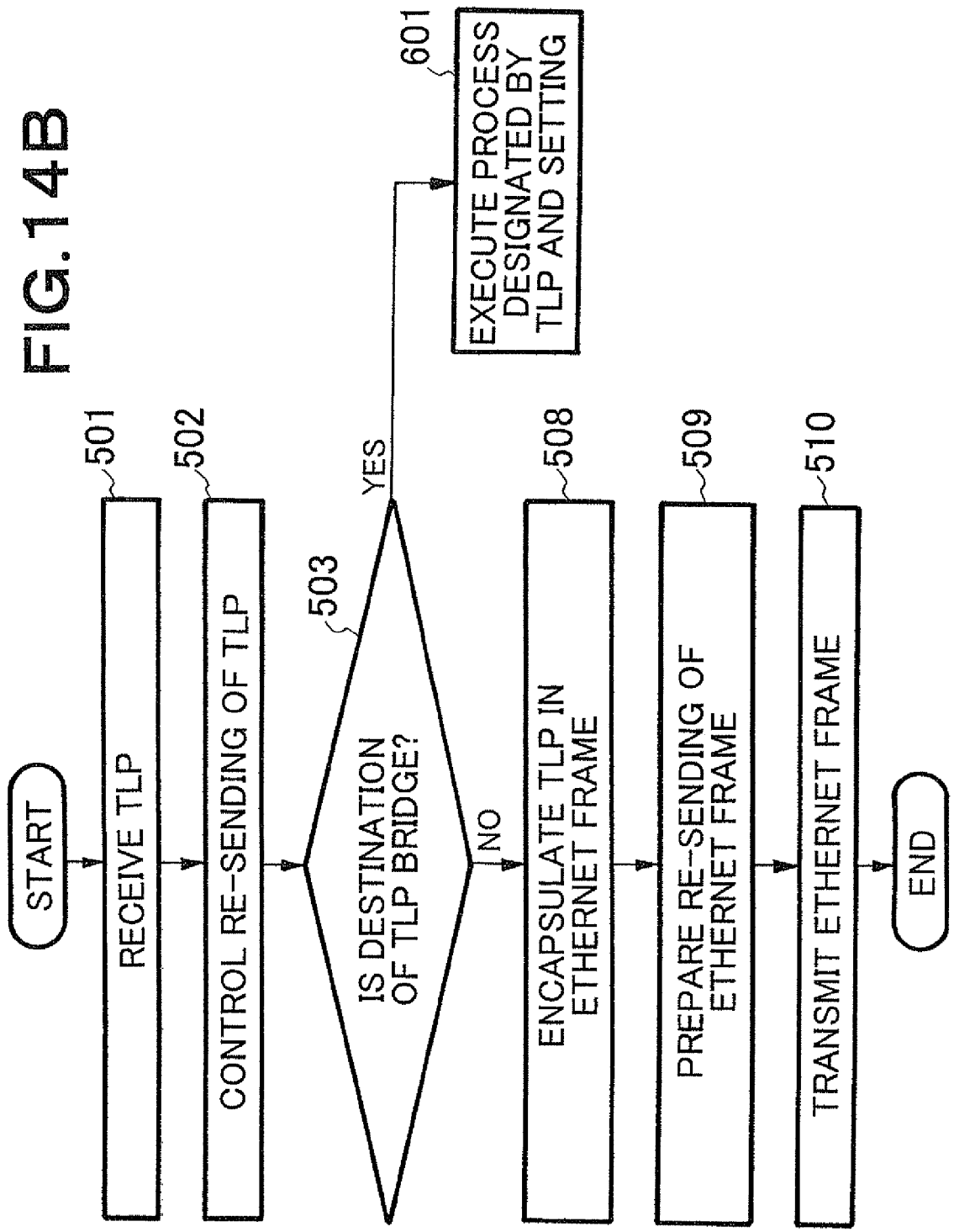
FIG. 14B is a flow chart showing an operation performed when the downstream PCI Express-Ethernet bridge receives a TLP.

Referring to FIGS. 10B and 14B, in the downstream PCI Express-Ethernet bridge 108, an operation which encapsulates a TLP received from the peripheral device 109 in an Ethernet frame and transmits the Ethernet frame to the Ethernet switch 106 and an operation which receives a TLP addressed to the downstream PCI Express-Ethernet bridge 108 from the peripheral device 109 and stores the TLP will be described below in detail.

Of the operations shown in FIG. 14B, operations in steps except for step 601 are the same as the operations in the upstream PCI Express-Ethernet bridge 105 shown in FIG. 13A. Also, the operation in step 601 is the same as the operation in FIG. 14A in step 601. More specifically, the downstream PCI Express-Ethernet bridge control logic 215 receives a TLP, the destination of which is the bridge 108 from the TLP transfer logic 205 and executes processes designated by the TLP and setting of the bridge 108. The downstream PCI Express-Ethernet bridge control logic 215 may form and issue a TLP. As a result in step 601, the TLP may be returned. In this case, the formed TLP is given to the TLP transfer logic 205 and transmitted to the Ethernet switch 106 by the same procedures as in steps 508 to 510 in FIG. 14B or transmitted to the peripheral device 109 by the same procedures as those in steps 514 and 515 in FIG. 14A.

Referring to FIGS. 10A and 15A, in the upstream PCI Express-Ethernet bridge 105, an operation which receives a control Ethernet frame from the system manager 107 and performs processes designated by the control Ethernet frame and setting of the bridge 105 will be described below in detail.

Of operations shown in FIG. 15A, operations of the Ethernet physical layer 213 and the Ethernet data link layer 214 shown in step 511 and step 512 are the same as the operations in FIG. 13B. With the processes, when the control Ethernet frame is given from the Ethernet data link layer 214 through the Ethernet frame transfer logic 211, the upstream PCI Express-Ethernet bridge control logic 206 performs processes designated by the control Ethernet frame and setting of the bridge 105 (step 701).

The process in step 701 includes a process of performing connection and disconnection between the upstream PCI Express-Ethernet bridge 105 and the downstream PCI Express-Ethernet bridge 108 to allocate the peripheral device 109 to any one of the CPUs 101. When the bridge 105 is connected to the downstream PCI Express-Ethernet bridge 108, a MAC address of a destination for connection is notified by the control Ethernet frame. The MAC address is temporarily stored to be used in formation of the TLP encapsulating table 209. The upstream PCI Express-Ethernet bridge control logic 206 notifies the CPU 101 of interruption of a hot plug and hot removal of the peripheral device 109 with the notifications of connection and disconnection by the control Ethernet frame as momentums. With this notification, a PCI Express space is re-constructed and the PCI Express configuration space control TLP is issued. The upstream PCI Express-Ethernet bridge control logic 206 acquires destination information on the PCI Express configuration space such as a bus number and a device number allocated to the peripheral device 109 from the issued PCI Express configuration space control TLP and registers information related to the peripheral device 109 in the TLP encapsulating table 209 by using the destination information and the MAC address of the downstream PCI Express-Ethernet bridge 108 to which the peripheral device is connected.

The interruption notifications of the hot plug and the hot removal of the peripheral device 109 to the CPU 101 can also be performed by the downstream PCI Express-Ethernet bridge control logic 215 shown in FIG. 10B according to the specification of the standard PCI Express.

On the other hand, the upstream PCI Express-Ethernet bridge control logic 206 may form and issue a control Ethernet frame. As a result in step 701, the control Ethernet frame may be returned. In this case, the formed control Ethernet frame is given to the Ethernet frame transfer logic 211 and transmitted to the Ethernet switch 106 by the same procedures as in those in steps 509 and 510 shown in FIG. 13A.

Referring to FIGS. 10B and 15B, in the downstream PCI Express-Ethernet bridge 108, an operation which receives the control Ethernet frame from the system manager 107 and performs processes designated by the control Ethernet frame and setting of the bridge 108 will be described below in detail.

Regarding operations shown in FIG. 15B, operations of the Ethernet physical layer 213 and the Ethernet data link layer 214 shown in step 511 and step 512 are the same as the operations in FIG. 14A. With the processes, when the control Ethernet frame is given from the Ethernet data link layer 214 through the Ethernet frame transfer logic 211, the downstream PCI Express-Ethernet bridge control logic 215 performs processes designated by the control Ethernet frame and setting of the bridge 108 (step 702).

The process in step 702 includes a process of performing connection and disconnection between the bridge and the upstream PCI Express-Ethernet bridge 105 to allocate the peripheral device 109 to the CPU 101. When the bridge 108 is connected to the upstream PCI Express-Ethernet bridge 105, a MAC address of a destination for connection is notified by the control Ethernet frame. A process related to formation of the TLP encapsulating table 209 such as a process of using the MAC address in formation of the TLP encapsulating table 209 is the same as that in step 701 in FIG. 15A.

The downstream PCI Express-Ethernet bridge control logic 215 may form and issue the control Ethernet frame. As a result in step 702, the control Ethernet frame may be returned. In this case, the formed control Ethernet frame is given to the Ethernet frame transfer logic 211 and transmitted to the Ethernet switch 106 by the same procedures as those in steps 509 and 510 in FIG. 14B.

Effects of the embodiment will be explained below.

Figure 1:
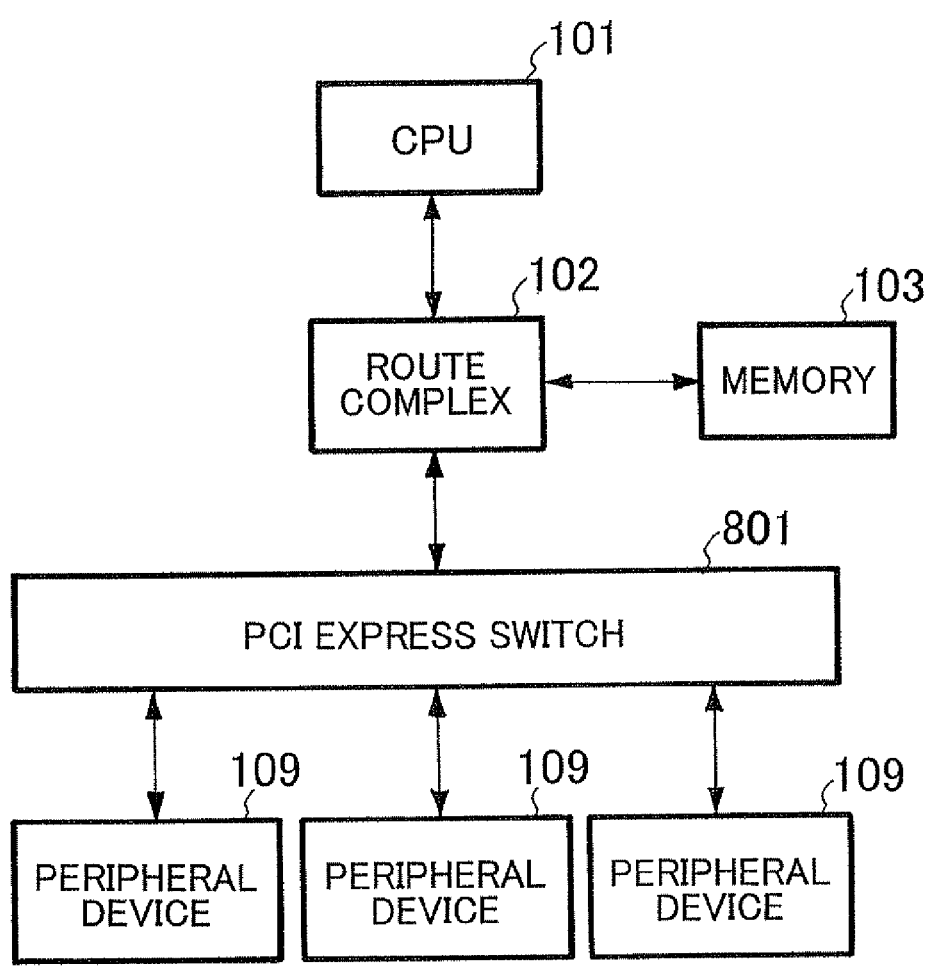
FIG. 1 is a block diagram of a conventional PCI Express switch network.
Figure 2:
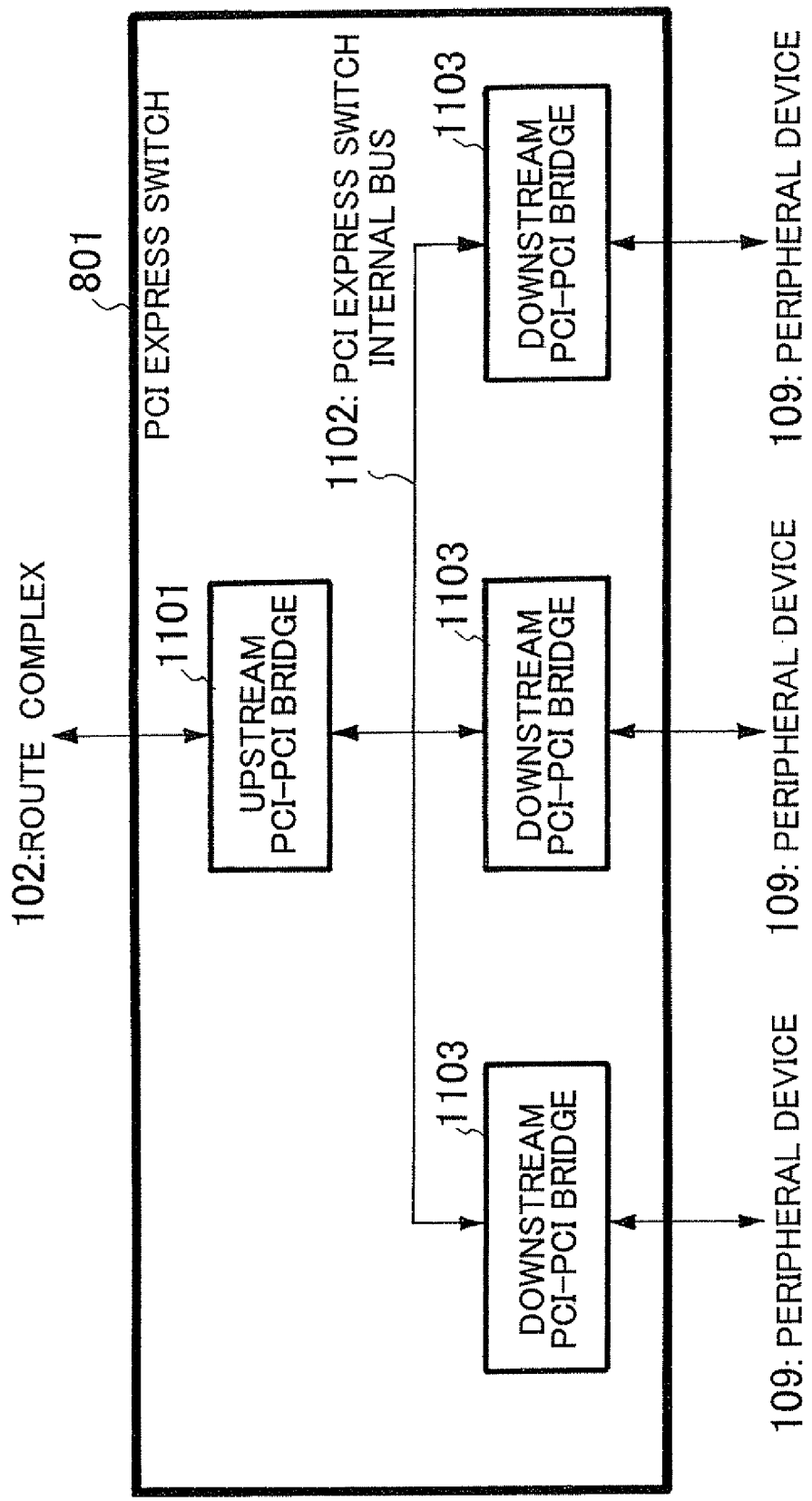
FIG. 2 is a block diagram of a conventional PCI Express switch.
Figure 3A:
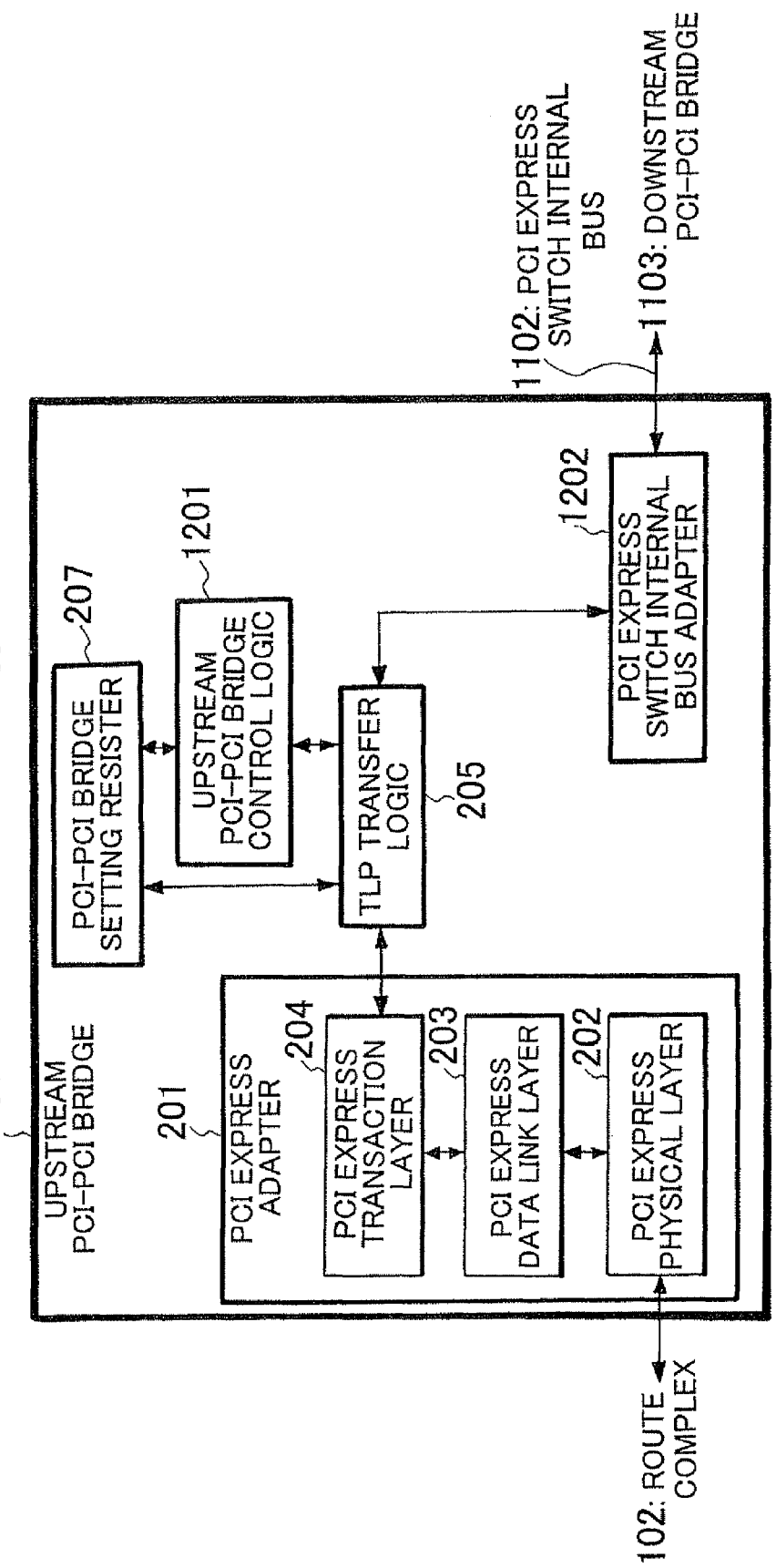
FIG. 3A is a block diagram of an upstream PCI-PCI bridge in a conventional PCI Express switch.
Figure 3B:
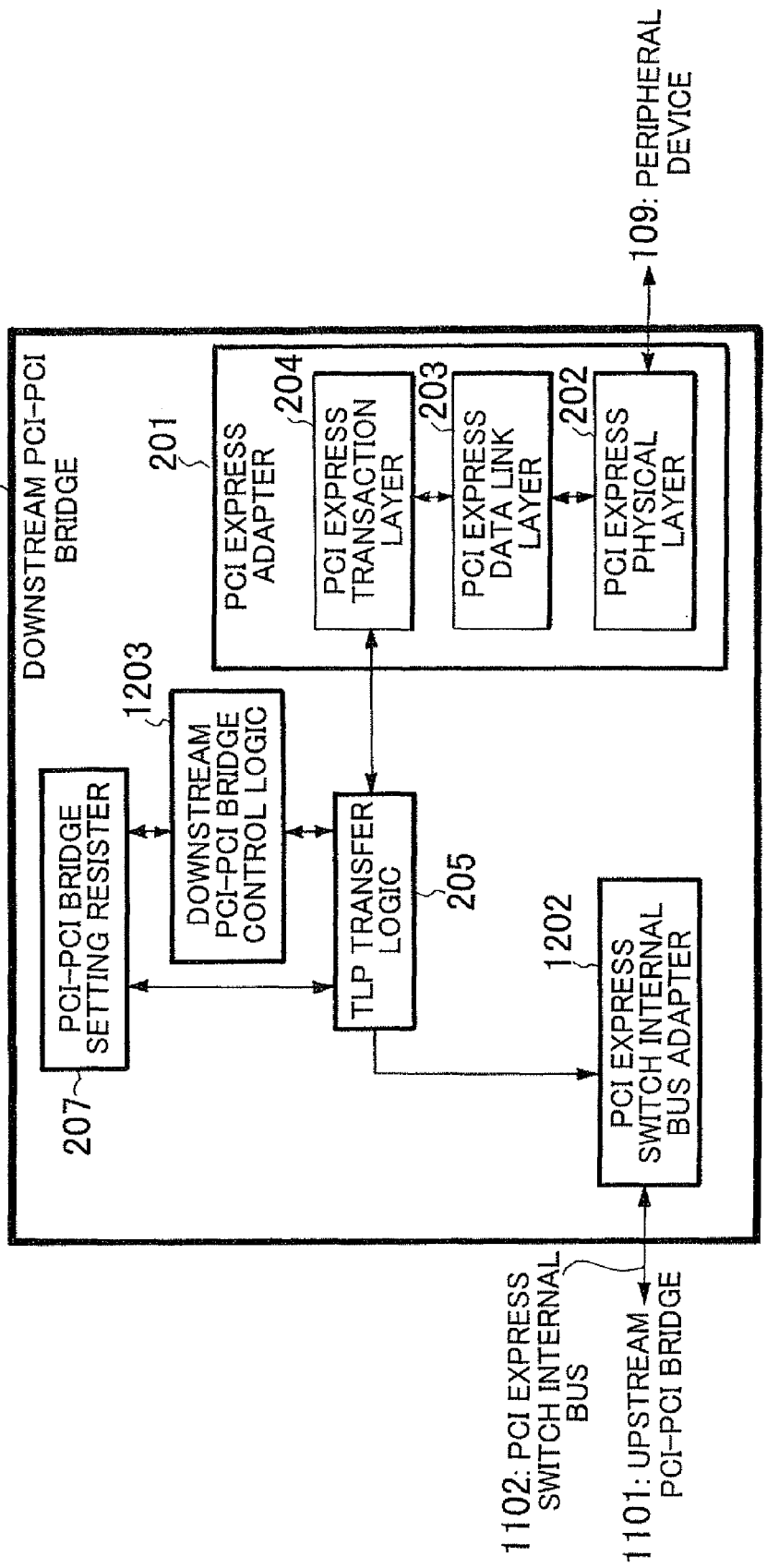
FIG. 3B is a block diagram of a downstream PCI-PCI bridge in a conventional PCI Express switch.
Figure 4:
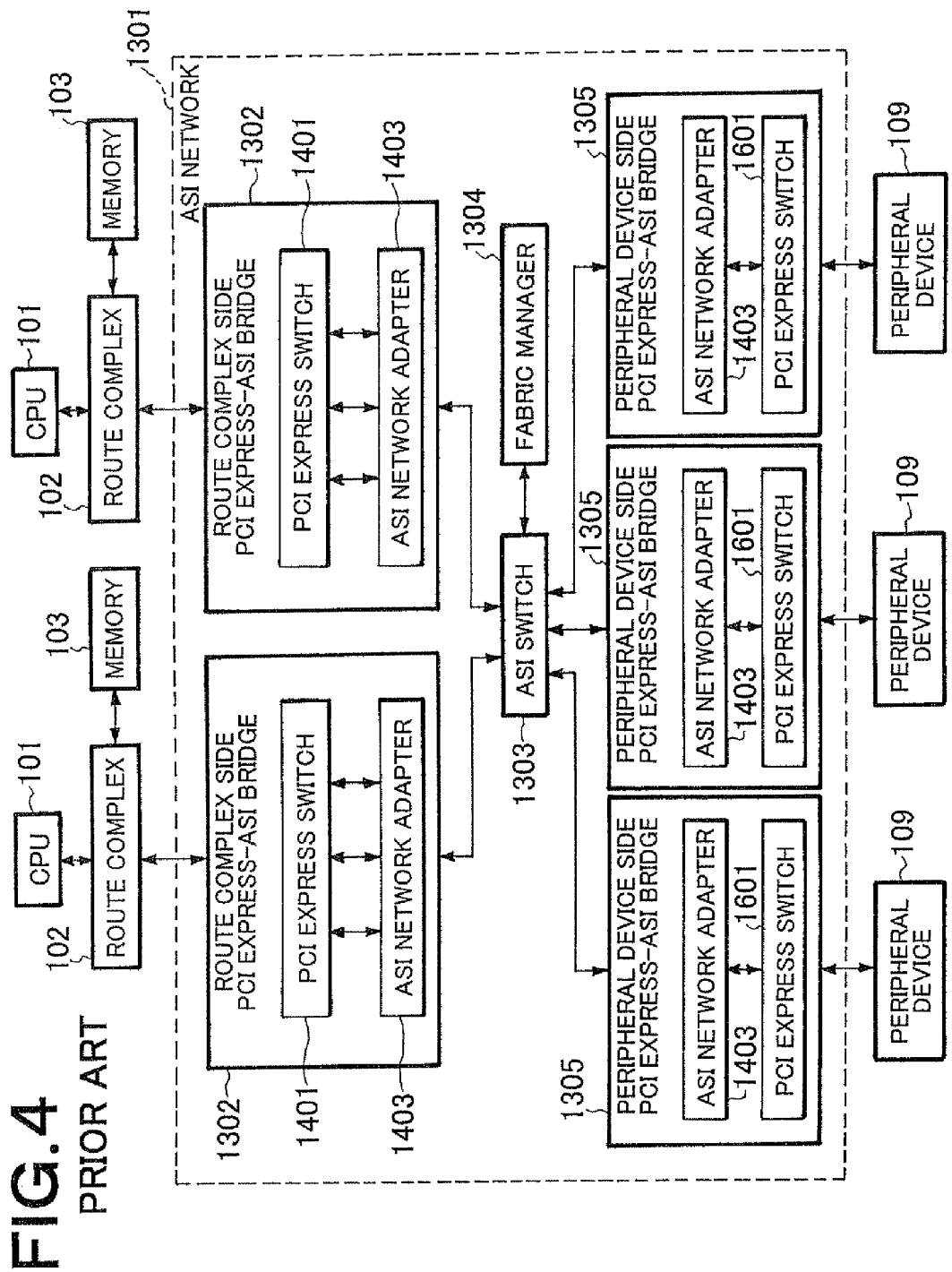
FIG. 4 is a block diagram of an ASI network.
Figure 5:
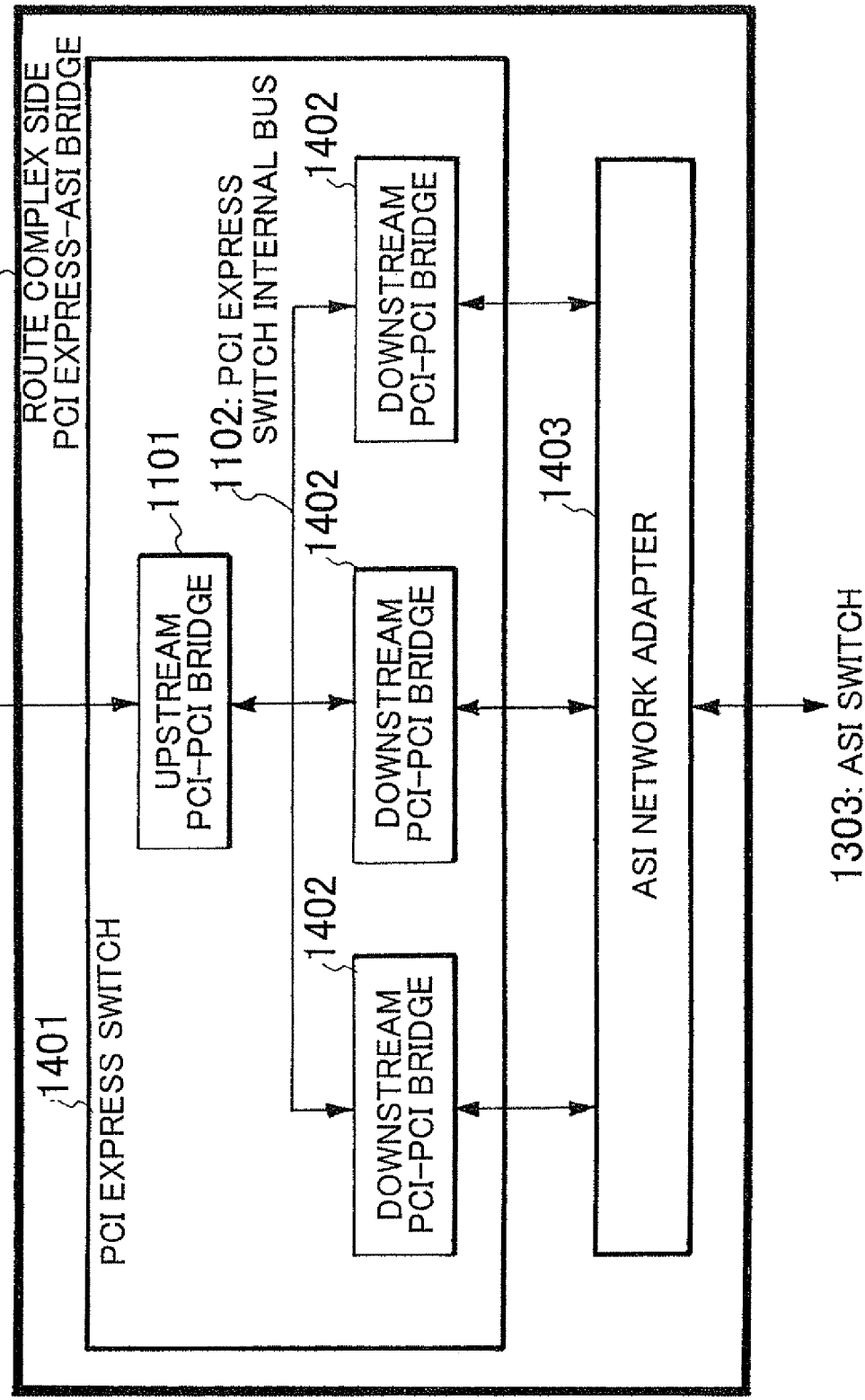
FIG. 5 is a block diagram of a route complex side PCI Express-ASI bridge of the ASI network.
Figure 6:
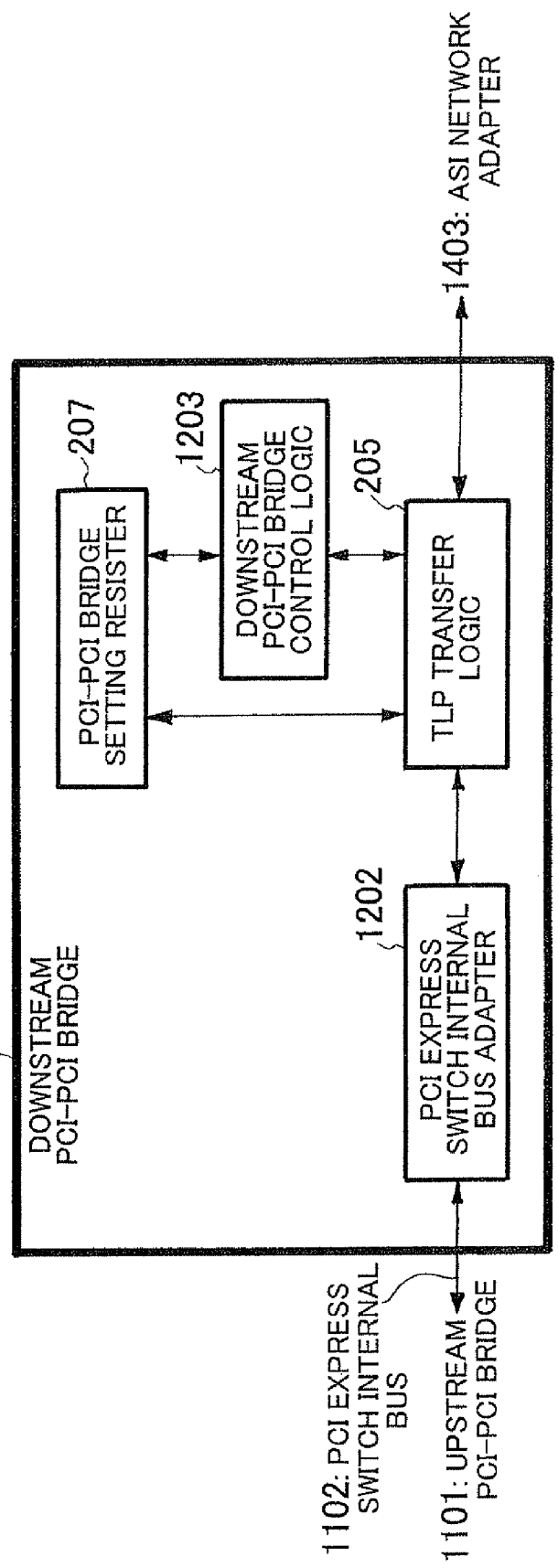
FIG. 6 is a block diagram of a downstream PCI-PCI bridge in a route complex side PCI Express-ASI bridge.
Figure 7:
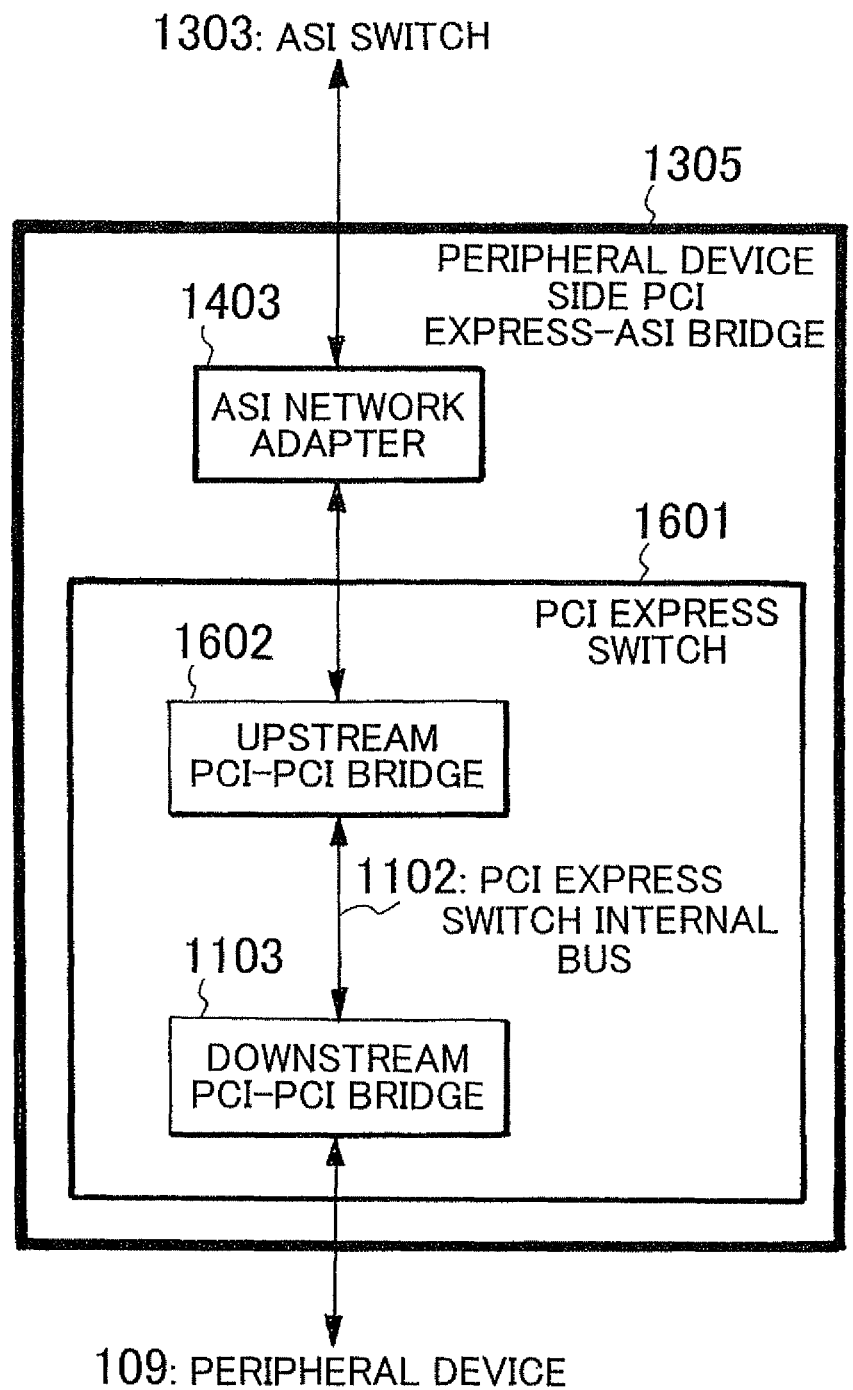
FIG. 7 is a block diagram of a peripheral device side PCI Express-ASI bridge of the ASI network.
Figure 8:
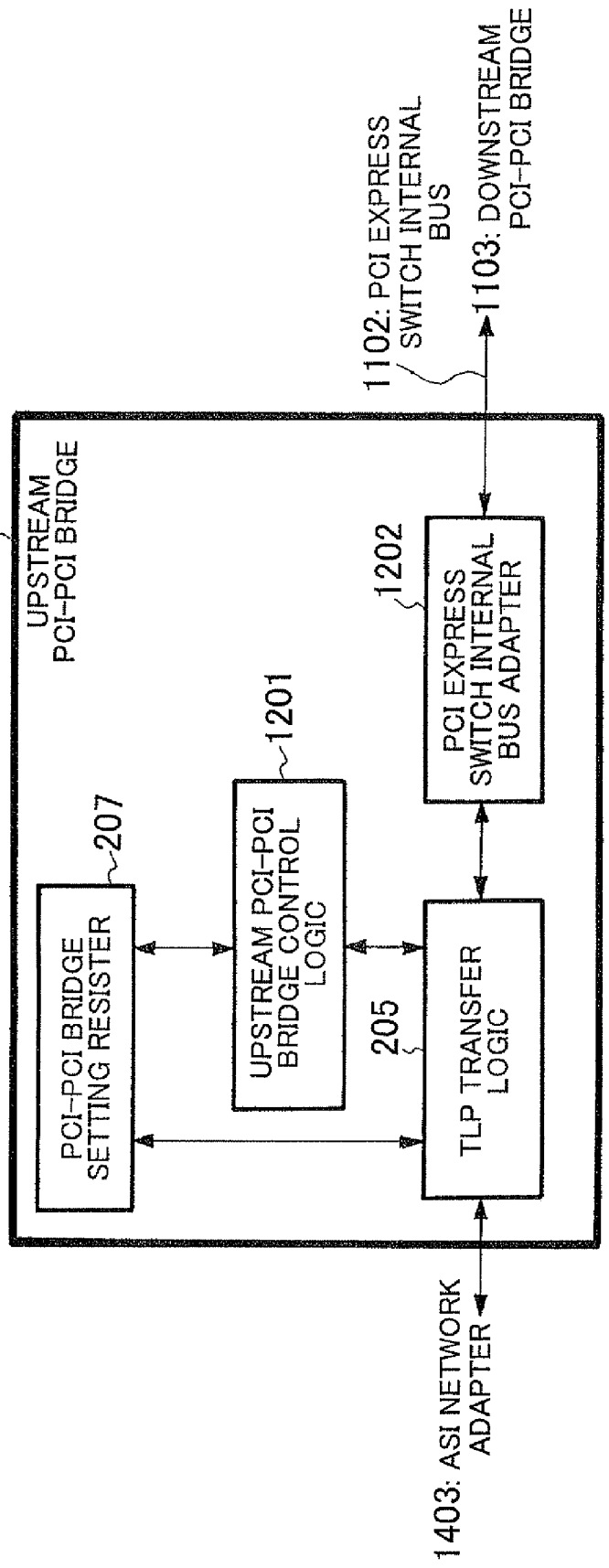
FIG. 8 is a block diagram of an upstream PCI-PCI bridge in the peripheral device side PCI Express-ASI bridge.

According to the embodiment, in a system in which a plurality of CPUs and a peripheral device are distributedly connected to a network to share the peripheral device by the plurality of CPUs, a circuit scale of bridges for connecting the CPUs and the peripheral device to the network can be considerably reduced. More specifically, the upstream PCI Express-Ethernet bridge 105 can be realized in a scale to the extent that circuits related to encapsulating and decapsulating of a TLP are added to a circuit of the upstream PCI-PCI bridge 1101 in the PCI Express switch 1401 constituting the route complex side PCI Express-ASI bridge 1302 in FIG. 4, and the downstream PCI Express-Ethernet bridge 108 can be realized in a scale to the extent that circuits related to encapsulating and decapsulating of a TLP are added to a circuit of the downstream PCI-PCI bridge 1103 in the PCI Express switch 1601 constituting the peripheral device side PCI Express-ASI bridge 1305 in FIG. 4.

According to the embodiment, in synchronism with reconstruction of a PCI Express space, the TLP encapsulating table 209 can be formed. This is because destination information on a PCI Express configuration space such as a bus number or a device number allocated to peripheral devices or the like is detected from the PCI Express configuration space control TLP to register correspondences between the detected designation information and MAC addresses of the bridges 105 and 108 to which the peripheral devices or the like are connected in the TLP encapsulating table 209.

According to the embodiment, because the switch according to the present invention comprising a plurality of upstream PCI Express-network bridges and a plurality of downstream PCI Express-network bridges connected to the plurality of upstream PCI Express network bridges through a network is equivalent to a conventional PCI Express switch, it is needless to change a conventional PCI software.

Another Embodiment

The first embodiment of the present invention has been described above. However, the present invention is not limited to the above example, and the following various additional changes can be effective.

In the first embodiment, the number of CPUs 101 connected to an Ethernet (Ethernet switch 106) is set at two, and the number of peripheral devices 109 is set at three. However, the present invention is not limited to these numbers.

In the first embodiment, a connection between bridges is managed by only MAC addresses. However, a tag for identifying a VLAN is used to make it possible to manage a combination of one upstream PCI Express-Ethernet bridge 105 and the downstream PCI Express-Ethernet bridge 108 connected to the bridge 105 as one VLAN.

Figure 16:
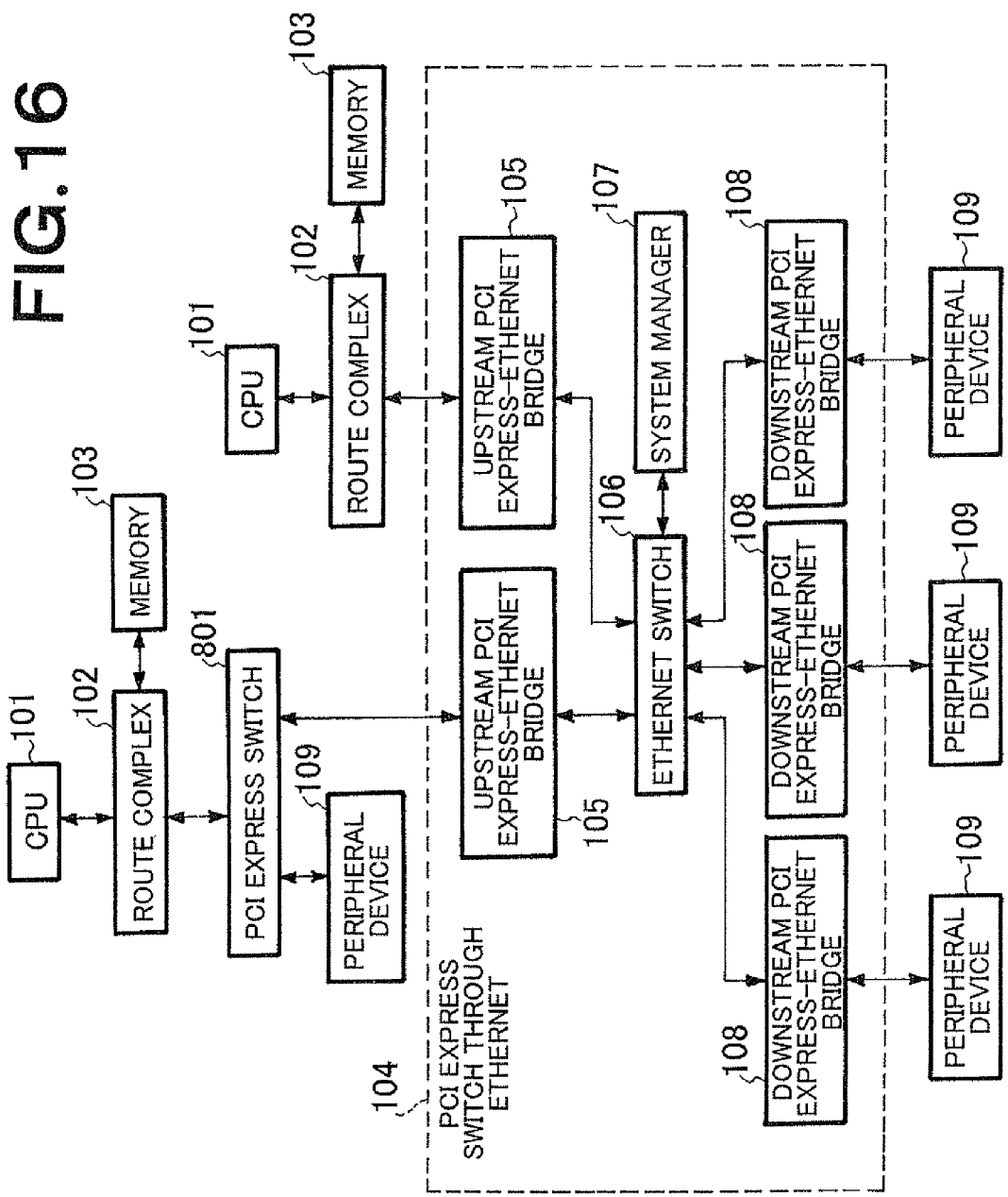
FIG. 16 is a block diagram of another embodiment of the present invention.

The first embodiment describes that the route complex 102 and the upstream PCI Express-Ethernet bridge 105 are directly connected to each other by a bus. However, as shown in FIG. 16, a block (configuration element) of another PCI Express such as the PCI Express switch 801 can be inserted between the route complex 102 and the upstream PCI Express-Ethernet bridge 105.

Figure 17:
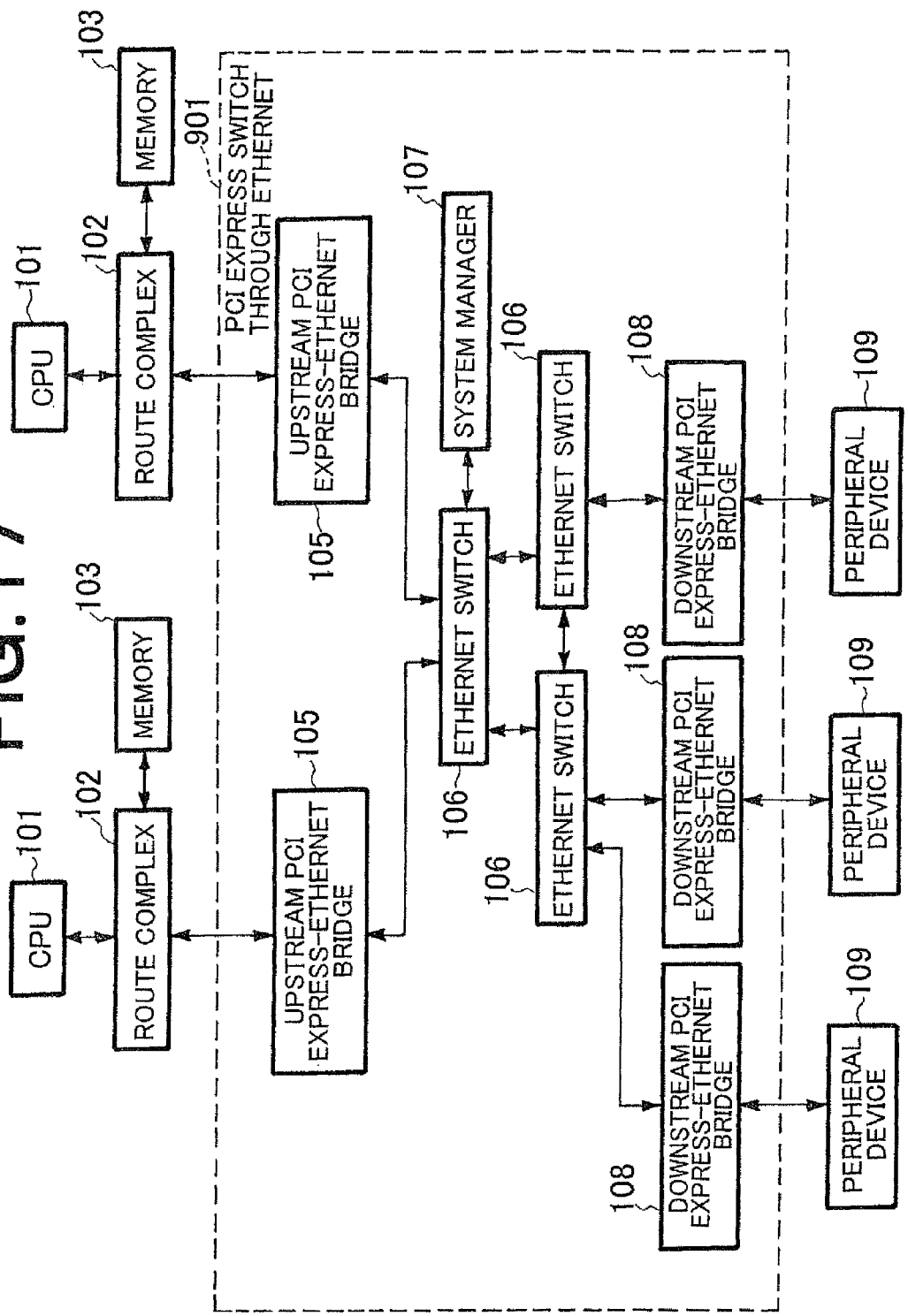
FIG. 17 is a block diagram of still another embodiment of the present invention.

In the first embodiment, one Ethernet switch 106 is used. However, as shown in FIG. 17, a configuration using a plurality of Ethernet switches 106 is available.

The upstream PCI Express-Ethernet bridge 105 and the downstream PCI Express-Ethernet bridge 108 can be realized by an FPGA and can also be realized by a processor and a program such as a DSP. The program is stored in a computer readable recording medium such as a semiconductor memory and controls the operation of a computer to cause the computer to function as the upstream PCI Express-Ethernet bridge 105 and the downstream PCI Express-Ethernet bridge 108 so as to execute the above processes.

In the first embodiment, an Ethernet is used as a network. However, the network is not limited to the Ethernet, anther type of network such as an FDDI may be used.

What is claimed is:

1. A network system that is part of a main system, the network system comprising:
    an internal network that resides in the network system;
    a first PCI express-network bridge which includes a first control unit and a first PCI express adapter which terminates a first PCI express bus; and
    a second PCI express-network bridge connected to the first PCI express-network bridge through said internal network, wherein the second PCI express-network bridge includes a second control unit and a second PCI express adapter which terminates a second PCI express bus,
    wherein said internal network, said first PCI express-network bridge, and said second PCI express-network bridge constitute a single PCI express switch,
    wherein the first control unit detects a destination of a packet sent from the first PCI express adapter, searches a packet encapsulating table for a physical address that corresponds to the destination, and encapsulates the packet in a frame so that the frame includes the physical address,
    wherein the second control unit removes the encapsulation tagged to the packet, and transfers the packet to the destination through the second PCI express bus by referring to a PCI express configuration register, and
    wherein the PCI express configuration register complies with a PCI express specification, whereby a configuration read/write packet is accessed, so that the main system regards said single PCI express switch as a conventional PCI express switch.

2. The network system according to claim 1, wherein the first control unit further includes a PCI express-network bridge control logic which detects destination information allocated to a peripheral device from the packet and registers a correspondence between the detected destination information and the physical address with the packet encapsulating table.

3. The network system according to claim 1, further comprising a plurality of the first PCI express-network bridges.

4. The network system according to claim 1, further comprising a plurality of the second PCI express-network bridges.

5. The network system according to claim 1, further comprising a plurality of the first PCI express-network bridges and a plurality of the second PCI express-network bridges.

6. An apparatus that is part of network system in a main system, the apparatus comprising:
    an internal network that resides in the apparatus;

a first PCI express-network bridge which includes a first control unit and a first PCI express adapter which terminates a first PCI express bus; and a second PCI express-network bridge connected to the first PCI express-network bridge through said internal network, wherein the second PCI express-network bridge includes a second control unit and a second PCI express adapter which terminates a second PCI express bus, wherein said internal network, said first PCI express-network bridge, and said second PCI express-network bridge constitute a single PCI express switch, wherein the first control unit detects a destination of a packet sent from the first PCI express adapter, searches a packet encapsulating table for a physical address that corresponds to the destination, and encapsulates the packet in a frame so that the frame includes the physical address, wherein the second control unit removes the encapsulation tagged to the packet, and transfers the packet to the destination through the second PCI express bus by referring to a PCI express configuration register, and wherein the PCI express configuration register complies with a PCI express specification, whereby a configuration read/write packet is accessed, so that the main system regards said single PCI express switch as a conventional PCI express switch.

7. The apparatus according to claim 6, wherein the first control unit further includes a PCI express-network bridge control logic which detects destination information allocated to a peripheral device from the packet and registers a correspondence between the detected destination information and the physical address with the packet encapsulating table.

8. The apparatus according to claim 6, further comprising a plurality of the first PCI express-network bridges.

9. The apparatus according to claim 6, further comprising a plurality of the second PCI express-network bridges.

10. The apparatus according to claim 6, further comprising a plurality of the first PCI express-network bridges and a plurality of the second PCI express-network bridges.

11. A method of controlling a network system that is a part of a main system, wherein the network system comprises an internal network that resides in the network system, a first PCI express-network bridge which includes a first control unit and a first PCI express adapter which terminates a first PCI express bus, and a second PCI express-network bridge connected to the first PCI express-network bridge through said internal network, wherein the second PCI express-network bridge includes a second control unit and a second PCI express adapter which terminates a second PCI express bus, wherein said internal network, said first PCI express-network bridge, and said second PCI express-network bridge constitute a single PCI express switch, the method comprising:

detecting, at the first control unit, a destination of a packet sent from the first PCI express adapter;

searching, at the first control unit, a packet encapsulating table for a physical address that corresponds to the destination;

encapsulating, at the first control unit, the packet in a frame so that the frame includes the physical address;

removing, at the second control unit, the encapsulation tagged to the packet; and transferring, at the second control unit, the packet to the destination through the second PCI express bus by referring to a PCI express configuration register, and wherein the PCI express configuration register complies with a PCI express specification, whereby a configuration read/write packet is accessed, so that the main system regards said single PCI express switch as a conventional PCI express switch.

12. The method according to claim 11, wherein the first control unit further includes a PCI express-network bridge control logic which detects destination information allocated to a peripheral device from the packet and registers a correspondence between the detected destination information and the physical address with the packet encapsulating table.

13. The method according to claim 11, wherein the network system further comprises a plurality of the first PCI express-network bridges.

14. The method according to claim 11, wherein the network system further comprises a plurality of the second PCI express-network bridges.

15. The method according to claim 11, wherein the network system further comprises a plurality of the first PCI express-network bridges and a plurality of the second PCI express-network bridges.

* * * * *